United States Patent
Tsukada

(10) Patent No.: US 10,353,650 B2
(45) Date of Patent: Jul. 16, 2019

(54) IMAGE PROCESSING APPARATUS OBTAINING A RECORD OF AN EVENT HAVING OCCURRED DURING THE TRANSITION OF THE MAIN CPU FROM SLEEP TO NORMAL OPERATION AND RECORDING MEDIUM

(71) Applicant: Konica Minolta, Inc., Chiyoda-ku, Tokyo (JP)

(72) Inventor: Koji Tsukada, Hamamatsu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/948,150

(22) Filed: Apr. 9, 2018

(65) Prior Publication Data

US 2018/0307445 A1 Oct. 25, 2018

(30) Foreign Application Priority Data

Apr. 20, 2017 (JP) .................................. 2017-83878

(51) Int. Cl.

| | |
|---|---|
| G06F 3/12 | (2006.01) |
| H04N 1/00 | (2006.01) |
| G03G 15/00 | (2006.01) |
| G06F 21/31 | (2013.01) |
| G06F 1/26 | (2006.01) |

(52) U.S. Cl.
CPC ....... *G06F 3/1221* (2013.01); *G03G 15/5004* (2013.01); *G06F 3/1204* (2013.01); *G06F 3/1229* (2013.01); *G06F 3/1238* (2013.01); *G06F 21/31* (2013.01); *H04N 1/00891* (2013.01); *H04N 1/00896* (2013.01); *G06F 1/26* (2013.01)

(58) Field of Classification Search
None
See application file for complete search history.

(56) References Cited

U.S. PATENT DOCUMENTS

2003/0051181 A1* 3/2003 Magee .................. G06F 1/3203
713/320
2008/0278774 A1* 11/2008 Enami ................ H04N 1/00681
358/475

(Continued)

FOREIGN PATENT DOCUMENTS

| EP | 2 725 425 A2 | 4/2014 |
|---|---|---|
| JP | H10-257256 A | 9/1998 |

(Continued)

*Primary Examiner* — Miya J Williams
(74) *Attorney, Agent, or Firm* — Squire Patton Boggs (US) LLP

(57) ABSTRACT

An image processing apparatus includes: one or more than one sensor that senses an event on the image processing apparatus; a first memory; a main CPU that loses power supply while sleep mode is on; and a subordinate CPU that receives power supply even while sleep mode is on. The subordinate CPU performs: terminating sleep mode; judging whether not an event occurs on the image processing apparatus by inquiring of the one or more than one sensor, at predetermined intervals during the transition of the main CPU from sleep to normal operation; and storing a record of an event on the first memory if it occurs. After the transition, the main CPU retrieves the record from the first memory and performs processing using it.

17 Claims, 27 Drawing Sheets

(56) References Cited

U.S. PATENT DOCUMENTS

| | | | |
|---|---|---|---|
| 2010/0293403 A1* | 11/2010 | Yamashita | H04N 1/00687 |
| | | | 713/323 |
| 2012/0182568 A1* | 7/2012 | Isogai | G03G 15/5004 |
| | | | 358/1.13 |
| 2013/0204663 A1* | 8/2013 | Kahlow | G06Q 30/0202 |
| | | | 705/7.31 |
| 2014/0022605 A1 | 1/2014 | Shimizu | |
| 2014/0118765 A1* | 5/2014 | Yang | G03G 15/5004 |
| | | | 358/1.13 |
| 2014/0160514 A1* | 6/2014 | Matsuyama | H04N 1/32609 |
| | | | 358/1.14 |
| 2014/0173315 A1 | 6/2014 | Yokoyama | |
| 2015/0009518 A1 | 1/2015 | Kashiwagi | |
| 2016/0277619 A1 | 9/2016 | Asai et al. | |
| 2018/0015755 A1* | 1/2018 | Yamada | B41J 29/393 |
| | | | 358/1.15 |
| 2018/0348844 A1* | 12/2018 | Lingutla | G06F 1/3231 |

FOREIGN PATENT DOCUMENTS

| | | |
|---|---|---|
| JP | 2011-59414 A | 3/2011 |
| JP | 2012-142821 A | 7/2012 |

\* cited by examiner

| Log No. | Time Stamp | Event |
|---|---|---|
| 1. | 100ms | DF: Signal ON → OFF |
| 2. | 200ms | 20-degree Angle Sensor: Signal ON → OFF |
| 3. | N/A | N/A |
| 4. | N/A | N/A |
| 5. | N/A | N/A |

FIG.12

| Log No. | DF Event Sensor | 20-degree Angle Sensor |
|---|---|---|
| 1. | 100 ms: Signal ON → OFF | 200 ms: Signal ON → OFF |
| 2. | N/A | N/A |
| 3. | N/A | N/A |
| 4. | N/A | N/A |
| 5. | N/A | N/A |

FIG.13

[Document size sensing operation in Step S208]

| Log No. | Time Stamp | Event |
|---|---|---|
| 1. | 100ms | Authentication Device: Failure → Success ID=1 |
| 2. | 700ms | Authentication Device: Success → Failure |
| 3. | 1200ms | Authentidation Device: Failure → Success ID=2 |
| 4. | 2000ms | Authentication Device: Success → Failure |
| 5. | N/A | N/A |

FIG.21

IMAGE PROCESSING APPARATUS OBTAINING A RECORD OF AN EVENT HAVING OCCURRED DURING THE TRANSITION OF THE MAIN CPU FROM SLEEP TO NORMAL OPERATION AND RECORDING MEDIUM

The disclosure of Japanese Patent Application No. 2017-083878, filed on Apr. 20, 2017, including description, claims, drawings, and abstract, is incorporated herein by reference in its entirety.

BACKGROUND

Technological Field

The present invention relates to: an image processing apparatus provided with a main CPU to lose power supply while sleep mode is on and a subordinate CPU to receive power supply even while sleep mode is on; and a recording medium storing a program to make the image processing apparatus to resume from sleep mode.

Description of the Related Art

In recent years, it is not unusual for an image processing apparatus such as a multifunctional digital image forming apparatus having various function such as copier function, printer function, and facsimile function, as referred to as a multifunction peripheral (MFP), to enter sleep mode without any event for a certain period of time. While the reduction of power consumption has been an issue of paramount importance, the transition period from sleep to standby has been a concern left unconsidered.

Most image processing apparatuses today are configured to enter sleep mode without any event for a certain period of time, and further required to resume from sleep mode as quickly as it enters sleep mode.

There is a practical method for achieving low power consumption in sleep mode without sacrificing performance in normal operation mode, requiring a subordinate CPU that consumes a small amount of power but runs slowly for continuous signal monitoring and a main CPU that consumes a large amount of power but runs fast. The subordinate CPU turns on and off the main CPU to switch the mode between normal operation and sleep. Being turned on, the main CPU starts the initialization. In this method, during the transition from sleep to normal operation, the main CPU does not run as fast as desired because initializing the values on the main CPU itself and its own external memory and modules still causes a high load on the main CPU.

This means, the main CPU is not allowed to judge whether or not an event occurs on the image processing apparatus, during the transition from sleep to normal operation. This method has an unsolved problem as described below.

For example, the user may open the document cover while sleep mode is on, and set a document in position to make a copy. In this case, a sensing means senses the opening of the document cover and sleep mode is terminated. In this method, however, the main CPU is not allowed to judge whether or not the document cover is open during the transition from sleep to normal operation. Instead, the main CPU displays a message stating "document size sensing error" on the operation panel. Seeing this message, the user has to manipulate paper size settings or to open and close the document cover again to make a sensing means sense the document size in a mechanical manner, which is inconvenient in either case.

The operation panel of the image processing apparatus may have a screen display key for displaying a registered screen on the operation panel, which is a hardware key. In this case, a sensing means senses the pressing of the screen display key if the screen display key is kept pressed for a certain period of time or more. In this method, however, the main CPU is not allowed to judge whether or not the screen display key is pressed during the transition from sleep to normal operation. The main CPU fails to sense the pressing of the screen display key during the transition; and the screen display key will not be kept pressed for a certain period of time or more, resulting in that the same screen, a default screen, being continuously displayed on the operation panel. To display a registered screen, the user has to press the screen display key again, which is still inconvenient.

To solve the inconvenience, the temporal conditions for sensing the pressing of the key may be different between the pre-transition and in-transition phase. In this case, the user needs to keep the difference in mind when manipulating, which is not user-friendly.

The image processing apparatus may be configured to make an external authentication device perform authentication on the user using a wireless IC card that records user information, for example. In this case, the external authentication device performs authentication at a predetermined timing, and the image processing apparatus judges whether or not the user is successfully authenticated by inquiring of the authentication device at certain intervals. It is known that, for the sake of security, an IC card should better be withdrawn from the card reading device immediately after the authentication.

In this method, however, the main CPU is not allowed to judge whether or not the user is successfully authenticated during the transition from sleep to normal operation. The main CPU fails to sense the success of the authentication during the transition, and even can fail after the transition if the user has withdrawn his/her IC card from the card reading device. Instead, the main CPU displays a message stating "please put your IC card" on the operation panel. Seeing this message, the user has to put his/her IC card close to the card reading device again for the authentication, which is inconvenient.

As described above, in the conventional method, the main CPU is not allowed to judge whether or not an event occurs on the image processing apparatus, during the transition from sleep to normal operation, which is inconvenient and not user-friendly.

Japanese Unexamined Patent Application Publication No. 2011-059414 discloses an image forming apparatus in which an environment monitor is positioned between a resuming monitor and a main section including an imaging device. While sleep mode is on, the environment monitor measures air temperature and humidity and stores a flag indicating the presence/absence of condensation in a register space. Upon being restored to normal operation, the CPU of the main section judges whether or not to remove moisture from the photosensitive drum with reference to the information stored thereon.

Japanese Unexamined Patent Application Publication No. H10-257256 suggests a document size sensing device to be provided in a copier or facsimile device having separate CPUs: one CPU receives one and off signal from the open-close sensing switch and the other CPU controls an image processing device, which allows the document size sensing device to sense the size of a document successfully regardless of the interval at which commands exchanged between the CPUs.

Japanese Unexamined Patent Application Publication No. 2012442821 suggests a control device to be provided in an image forming apparatus. While the image forming apparatus is connected to the network but the main CPU loses power supply, the first subordinate CPU automatically responds to an incoming signal on behalf of the main CPU. The second subordinate CPU judges whether or not the main CPU should enter power saving mode from standby mode; if it should enter power saving mode, the second subordinate CPU cuts off the power supply to the main CPU circuit. Before switching the mode to sleep, the second subordinate CPU further judges the connectivity of the image forming apparatus to the network by inquiring of the first subordinate CPU. While sleep mode is on, the second subordinate CPU judges whether or not an event requiring the mode switch occurs; if such an event occurs, the second subordinate CPU switches the mode from power saving mode.

However, the techniques disclosed in Japanese Unexamined Patent Application Publications No. 2011-059414, H10-257256, and 2012-142821 did not bring a solution to the problem described above. That is, the main CPU is not allowed to sense the opening and closing of the document cover or to sense the pressing of the screen display key, during the transition from sleep to normal operation; and the user is still bothered by manipulating again.

SUMMARY

The present invention, which has been made in consideration of such a technical background as described above, is allowed to enhance the convenience by obtaining a record of an event having occurred during the transition of the main CPU from sleep to normal operation and performing processing using it; and a recording medium.

A first aspect of the present invention relates to an image processing apparatus including:
one or more than one sensor that senses an event on the image processing apparatus;
a first memory;
a main CPU that loses power supply while sleep mode is on; and
a subordinate CPU that receives power supply even while sleep mode is on,
wherein:
the subordinate CPU performs: terminating sleep mode; judging whether not an event occurs on the image processing apparatus by inquiring of the one or more than one sensor, at predetermined intervals during the transition of the main CPU from sleep to normal operation; and storing a record of an event on the first memory if it occurs; and
after the transition, the main CPU retrieves the record from the first memory and performs processing using it.

A second aspect of the present invention relates to a non-transitory computer-readable recording medium storing a program for an image processing apparatus including:
one or more than one sensor that senses an event on the image processing apparatus;
a first memory;
a main CPU that loses power supply while sleep mode is on; and
a subordinate CPU that receives power supply even while sleep mode is on, the program to make the subordinate CPU of the image processing apparatus perform: terminating sleep mode; judging whether not an event occurs on the image processing apparatus by inquiring of the one or more than one sensor, at predetermined intervals during the transition of the main CPU from sleep to normal operation; and storing a record of an event on the first memory if it occurs.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 12 is an example of an event log table stored on a non-volatile RAM.

FIG. 13 is another example of the event log table shown in FIG. 12, containing a set of records classified by sensor.

FIG. 21 is another example of the records in the event log table.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
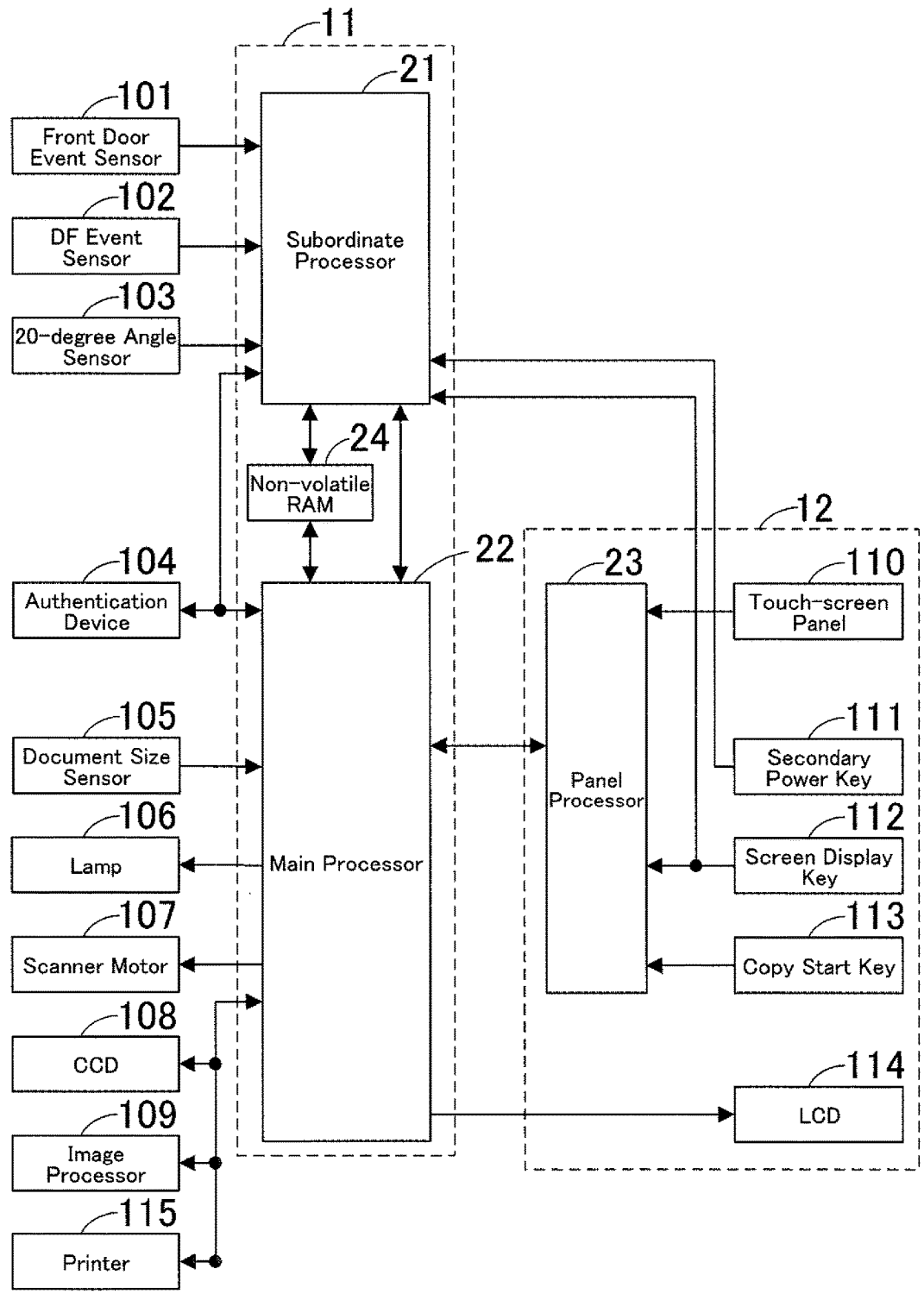
FIG. 1 is a block diagram illustrating an internal configuration of an image processing apparatus according to one embodiment of the present invention.

FIG. 1 is a block diagram illustrating an internal configuration of an image processing apparatus according to one embodiment of the present invention.

As illustrated in the figure, the image processing apparatus is essentially provided with: a processor 11; an operation panel 12; a front door event sensor 101; a DF event sensor 102; a 20-degree angle sensor 103; an authentication device 104; a document size sensor 105; a lamp 106; a scanner motor 107; a CCD 108; an image processor 109; and a printer 115.

The front door event sensor 101 is a sensor that senses the opening and closing of the front door of the image processing apparatus, and is comprised of a photosensor. The signal is off (level H) when the front door is open, and the signal is on (level L) when the front door is closed. Upon the opening of the front door, the supply of power to the internal motor mechanism is cut off for the sake of user safety. This configuration allows the user to select a period of time for which the front door can be left open according to his/her preference such that, in case of an error to the motor mechanism which is controlled by the firmware (FW), the user will be able to reset the state manually. The front door is equipped with a magnetic closure for the resistance to repeated opening and closing. Although the magnetic closure can hold the front door properly closed when the user opens and closes it slowly enough, it can fail when the user opens and closes it quickly. So, this configuration needs to have a mechanism to eliminate chattering.

Figure 5:
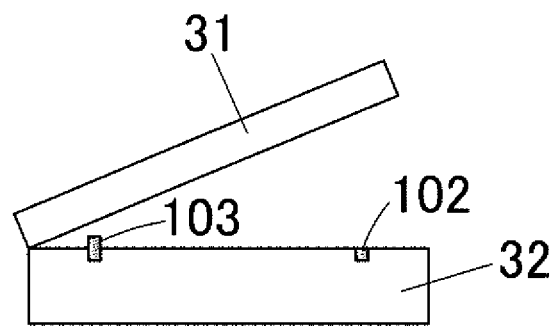
FIG. 5 is a schematic drawing illustrating the positions of sensors to be used when a document is scanned.
Figure 6:
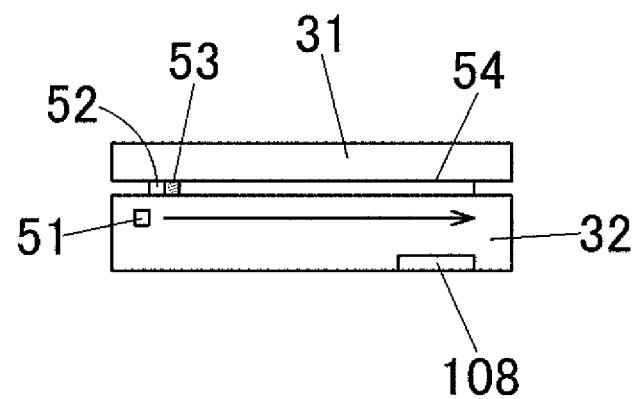
FIG. 6 is a schematic drawing illustrating the position of a shading reference plate.

The DF event sensor 102 is a sensor that senses the opening and closing of an automatic document feeder (to be also referred to as DF for short) 31 as illustrated in FIGS. 5 and 6, and is comprised of a magnetic sensor. The DF 31 is a combination of a document cover for fixing a document on the platen and a document conveyor that conveys a document mechanically. The signal is off (level H) when the DF 31 is open, and the signal is on (level L) when the DF 31 is closed.

The 20-degree angle sensor 103 is a sensor that senses the angle of the DF 31 when the user opens the DF 31, and is comprised of a photosensor. When the undersurface of the DF 31 illustrated in FIGS. 5 and 6 is positioned at an angle of greater than 20 degrees with respect to a platen glass 54, the signal is off (level II). When it is positioned at an angle of 20 degrees or less, the signal is on (level L) and the size of a document thus can be sensed.

The authentication device 104 performs user authentication using a wireless IC card and responds to a request from the processor 11. During the transition of a main processor 22 from sleep to normal operation, the authentication device 104 performs authentication as instructed by the subordinate processor 21. The authentication device 104 may be comprised of an external apparatus.

The document size sensor 105 is comprised of a photoreflective sensor, and senses the presence or absence of reflected light from a document. By judging the presence or absence of a document in sub-scanning (FD) lines, the document size sensor 105 senses the sub-scanning (FD) dimension of the document.

The lamp 106 is disposed on a slider 51 (shown in FIG. 6), and turns on its LED light source in sync with the image scanning of the CCD 108.

The scanner motor 107 runs the slider 51 to a position determined by the number of pulses.

The CCD 108 is comprised of a color linear sensor, and receives reflected light from a document to convert to image data.

The image processor 109 applies correction to the image data obtained by the CCD 108 to fit it to the purpose.

The printer 115 prints the following data on paper: image data obtained by the CCD 108 then subjected to correction by the image processor 109; print data received externally; and fax data received externally.

The processor 11 is provided with the subordinate processor 21; the main processor 22; and a non-volatile RAM 24.

The subordinate processor 21 controls the image processing apparatus basically while the main processor 22 is not in normal operation mode. Specifically, the subordinate processor 21 receives user events and inputs to the image processing apparatus and control power supply. The subordinate processor 21 is an always-on processor, being allowed to receive power supply even while sleep mode is on.

Although the main processor 22 controls the image processing apparatus in a unified and systematic manner, it is turned off without power supply while sleep mode is on. When sleep mode is terminated, the main processor 22 restores power supply and starts the initialization; upon completing the initialization, the main processor 22 resumes normal operation. In this embodiment, the main processor 22 further performs different operations depending on the event having been sensed by the subordinate processor 22 during the transition from sleep to normal operation, as to be described later.

The non-volatile RAM 24 is a memory that stores records of the input events having been received by the subordinate processor 21 during the transition of the main processor 22 from sleep to normal operation. The non-volatile RAM 24 can be accessed both from the subordinate processor 21 and the main processor 22. The non-volatile RAM 24 may be an always-on RAM.

The operation panel 12 is provided with: a panel processor 23; a touch-screen panel 110; a secondary power key 111; a screen display key 112; a copy start key 113; and an LCD 114.

The touch-screen panel 110 senses a touch event on the touch-screen panel itself by sensing a change in electrostatic capacity. The secondary power key 111 can be pressed by the user giving instructions to switch the mode to sleep and to normal operation.

The screen display key 112 is a hardware key for the user to give an instruction to show a screen registered in advance. The signal is on (level L) when the key is pressed, and the signal is off (level H) when the key is unpressed. To prevent an accidental touch by the user and eliminate chattering, the signal should be on under the condition that the key is being pressed for more than a certain period. Each screen registered in advance may be associated with a user.

The copy start key 113 is a key for the user to initiate a copy job created by the user. The LCD 114 is a liquid-crystal display that shows operation screens.

Figure 2:
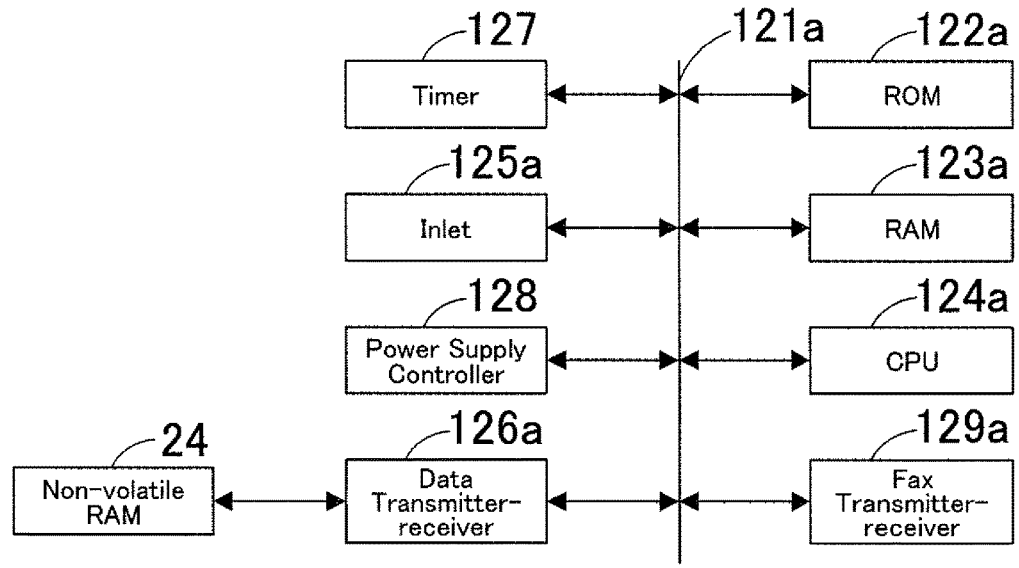
FIG. 2 is a block diagram illustrating an internal configuration of a subordinate processor.

FIG. 2 is a block diagram illustrating an internal configuration of the subordinate processor 21.

The subordinate processor 21 is provided with: a data bus 121a; a ROM 122a; a subordinate CPU 124a; a timer 127; an input portion 125a; a power supply controller 128; a data transmitter-receiver 126a; and a fax transmitter-receiver 129a.

Figure 3:
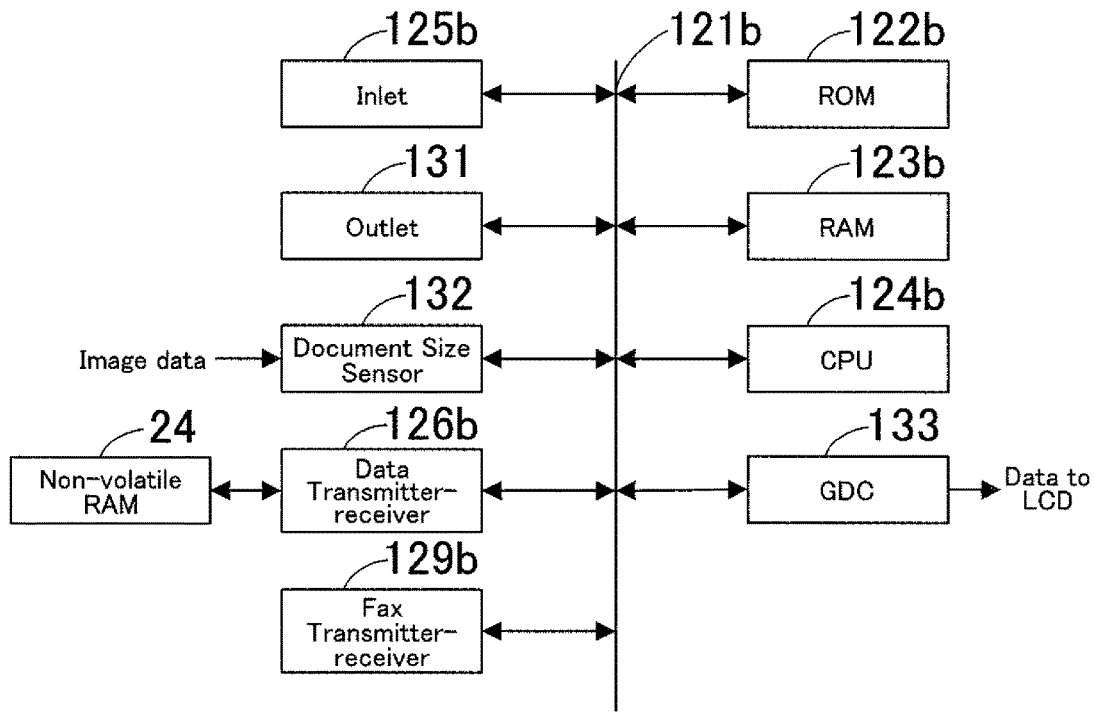
FIG. 3 is a block diagram illustrating an internal configuration of a main processor.

FIG. 3 is a block diagram illustrating an internal configuration of the main processor 22. The main processor 22 is provided with: a data bus 121b; a ROM 122b; a main CPU 124b; a graphic display controller (GDC) 133; an input portion 125b; an output portion 131; a document size sensor 132; a data transmitter-receiver 126b; and a fax transmitter-receiver 129b.

Figure 4:
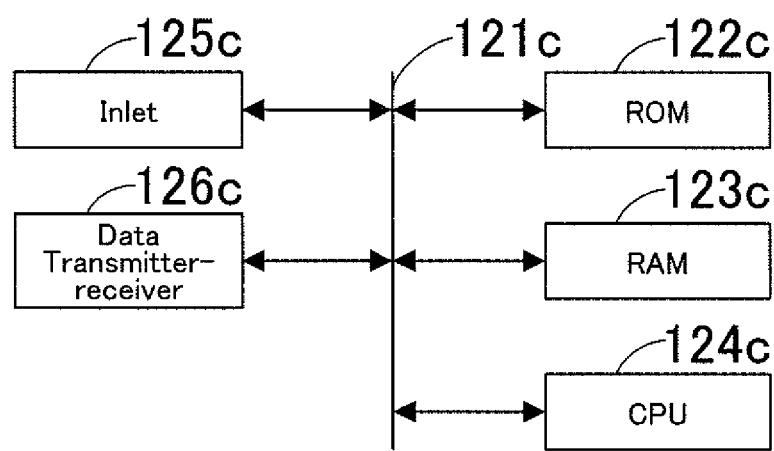
FIG. 4 is a block diagram illustrating an internal configuration of a panel processor.

FIG. 4 is a block diagram illustrating an internal configuration of the panel processor 23. The panel processor 23 is provided with: a data bus 121c; a ROM 122c; a RAM 123c; a CPU 124c; an input portion 125c; and a data transmitter-receiver 126c.

Referring to FIG. 2, the data bus 121a is a bus that allows the CPU 124a to read and write data from and to the ROM 122a and the RAM 123a; referring to FIG. 3, the data bus 121b is a bus that allows the CPU 124b to read and write data from and to the ROM 122b and the RAM 123b; referring to FIG. 4, the data bus 121c is a bus that allows the CPU 124c to read and write data from and to the ROM 122c and the RAM 123c.

The ROM 122a is a memory storing operation programs for the CPU 124a; the ROM 122b is a memory storing operation programs for the CPU 124b; the ROM 122c is a memory storing operation programs for the CPU 124c. The RAM 123a serves as a workspace memory for the CPU 124a; the RAM 123b serves as a workspace memory for the CPU 124b; the RAM 123c serves as a workspace memory for the CPU 124c. The CPU 124a controls the CPU 21 in a unified and systematic manner; the CPU 124b controls the CPU 22 in a unified and systematic manner; the CPU 124c controls the CPU 23 in a unified and systematic manner.

The input portions 125a, 125b, and 125c each sense the signals of sensors and keys and retain them for a certain period of time.

The data transmitter-receivers 126a, 126b, and 126c are connected to each other through a universal asynchronous receiver-transmitter (UART), being allowed to transmit and receive data to and from each other. The data transmitter-receiver 126a of the subordinate processor 21 and the data transmitter-receiver 126b of the main processor 22 each are connected to the non-volatile RAM 24, being allowed to read and write data from and to the non-volatile RAM 24.

The fax transmitter-receivers 129a and 129b each transmit and receive fax data through a fax line.

The timer 127 is provided with a timing means. Being given an initial value, the timer 127 starts counting down from the initial value. The timer 127 also provides time stamp values.

The power supply controller 128 turns on and off the main processor 22.

The output portion 131 turns on and off the lamp 106 and regulates the signal to the scanner motor 107.

The document size sensor 132 senses the main scanning (CD) dimension of a document with reference to the image data obtained by the CCD 108.

The GDC 133 reads out screen data to transfer to the operation panel 112 on a periodic basis.

FIG. 5 is a schematic drawing illustrating the arrangement of sensors that serve for document scanning. In this figure, code 32 indicates a scanner for scanning a document, including a platen the surface of which a document is to be set on. FIG. 5 is a side view of the DF 31 and the scanner 32. The DF event sensor 102 is positioned on the front side of the scanner 32. The 20-degree angle sensor 103 is positioned on the back side of the scanner 32, and is pressed and retracted when the undersurface of the DF 31 is positioned at an angle of 20 degrees or less.

FIG. 6 is a schematic drawing illustrating the position of a shading reference plate 53. In this figure, the slider 51 and the CCD 108 are positioned inside of the scanner 32; and, furthermore, a one-pass DF platen glass 52, the shading reference plate 53, and the platen glass 54 are positioned between the DF 31 and the scanner 32. The home position is fixed on the left of the one-pass DF platen glass 52; the position for document size sensing is fixed on the right of the shading reference plate 53. The sub-scanning dimension of a document is sensed by a sensor (not shown in the figure) that senses the presence or absence of a document. The main scanning dimension of a document is sensed by the CCD 108.

Figure 7:
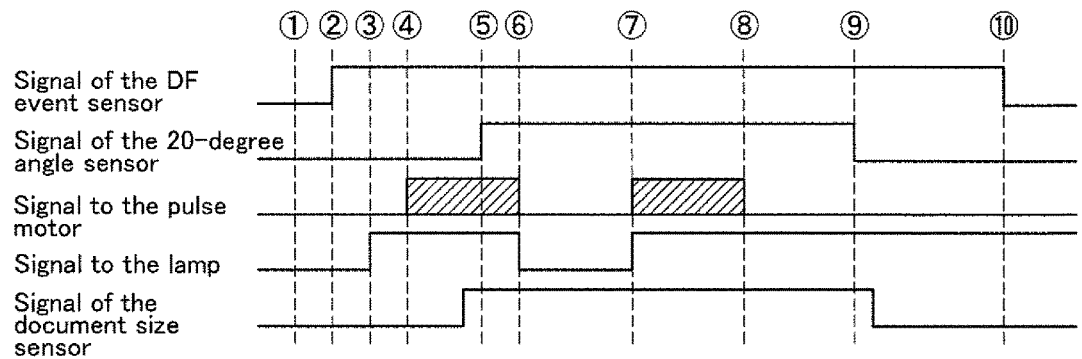
FIG. 7 is a timing diagram illustrating the document size sensing operation to be performed in the conventional method when sleep mode is terminated.

FIG. 7 is a timing diagram illustrating the document size sensing operation to be performed in the conventional method when sleep mode is terminated.

Sleep mode is on at the timing of circled number 1; at this timing, the subordinate processor 21 including the subordinate CPU 124a is running but the main processor 22 including the main CPU 124b is not running.

The user opens the DF 31 at the timing of circled number 2; at this timing, the DF event sensor 102 senses the opening of the DF 31. Being turned on, the main processor 22 starts the initialization at the timing of circled number 3.

At the timing of circled number 4, the slider 51 starts running from the home position to the shading reference plate 53. At the timing of circled number 5, the undersurface of the DF 31 is positioned at an angle of 20 degrees or less, permitting the sensing of document size. At the timing of circled number 6, the lamp 106 is turned on and the operation of obtaining reference data from the shading reference plate 53 is started.

At the timing of circled number 7, the operation of obtaining reference data from the shading reference plate 53 is completed and the slider 51 starts running back to the home position. At the timing of circled number 8, it is ready for document size sensing and the operation panel 12 displays a message stating "copy service available". The 20-degree angle sensor 103 waits for an event.

The user sets a document on the platen glass 54 and closes the DF 31 at the timing of circled number 9; at this timing, the 20-degree angle sensor 103 senses the closing of the DF 31. At this timing, the main processor 22 receives signals to sense the sub-scanning dimension of the document. The main processor 22 does not sense the main scanning dimension of the document because of not having control of the scanning of the CCD 108. The DF 31 is closed properly at the timing of circled number 10.

As described above, in the conventional method, the main processor 22 does not receive a notice of the opening of the DF 31. So, even when the user sets a document in position and closes the DF 31, the main processor 22 only fails to sense the document size. Instead, the main processor 22 displays a message stating "document size sensor error" on the operation panel. Seeing this message, the user has to manipulate paper size settings or to open and close the DF 31 again to allow document size sensing in a mechanical manner, which is inconvenient in either case.

Figure 8:
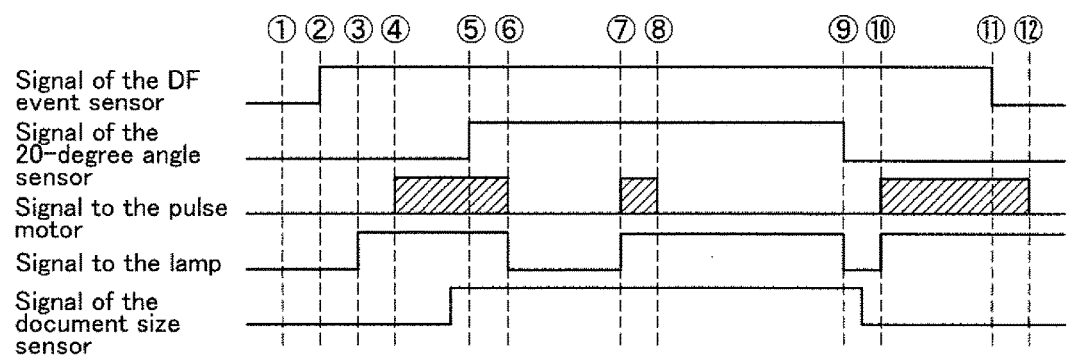
FIG. 8 is a timing diagram illustrating the document size sensing operation to be performed in this embodiment when sleep mode is terminated.

FIG. 8 is a timing diagram illustrating the document size sensing operation to be performed in this embodiment when sleep mode is terminated.

Sleep mode is on at the timing of circled number 1; at this timing, the subordinate processor 21 is running but the main processor 22 is not running.

The user opens the DF 31 at the timing of circled number 2; at this timing, the DF event sensor 102 senses the opening of the DF 31. The subordinate processor 21 stores a record indicating the opening of the DF 31 in the non-volatile RAM 24. Being turned on, the main processor 22 starts the initialization at the timing of circled number 3.

At the timing of circled number 4, the slider 51 starts running from the home position to the shading reference plate 53. At the timing of circled number 5, the undersurface of the DF 31 is positioned at an angle of 20 degrees or less, permitting the sensing of document size. Upon completing the initialization (startup), the main processor 22 receives a notice from the subordinate processor 21 and obtains the record of the opening of the DF 31 from the non-volatile RAM 24.

At the timing of circled number 6, the lamp 106 is turned on and the operation of obtaining reference data from the shading reference plate 53 is started. At the timing of circled number 7, the operation of obtaining reference data from the shading reference plate 53 is completed and the slider 51 starts running to the position for document size sensing. At the timing of circled number 8, it is ready for document size sensing.

The user sets a document on the platen glass 54 and closes the DF 31 at the timing of circled number 9; at this timing, the 20-degree angle sensor 103 senses the closing of the DF 31 and transfer a notice to the main processor 22. Receiving the notice, the main processor 22, as if the event had occurred in normal operation mode, turns on the lamp 106 and senses the signal of the linear sensor by running the CCD 108.

At the timing of circled number 10, the lamp 106 is turned off and the slider 51 starts running back to the home position. The DF 31 is closed properly at the timing of circled number 11. At the timing of circled number 12, the operation panel 12 displays a message stating "copy service available".

As described above, in this embodiment, after the transition from sleep to normal operation, the main processor 22 obtains a record indicating the opening of the DF 31 from the non-volatile RAM 24 and performs processing using it. The main processor 22 is thus allowed to sense the document size as if the event had occurred in normal operation mode. So, the user does not have to manipulate paper size settings or open and close the DF 31 again.

[Operation by the Subordinate Processor 21 in the Pre-Transition Phase]

Figure 9:
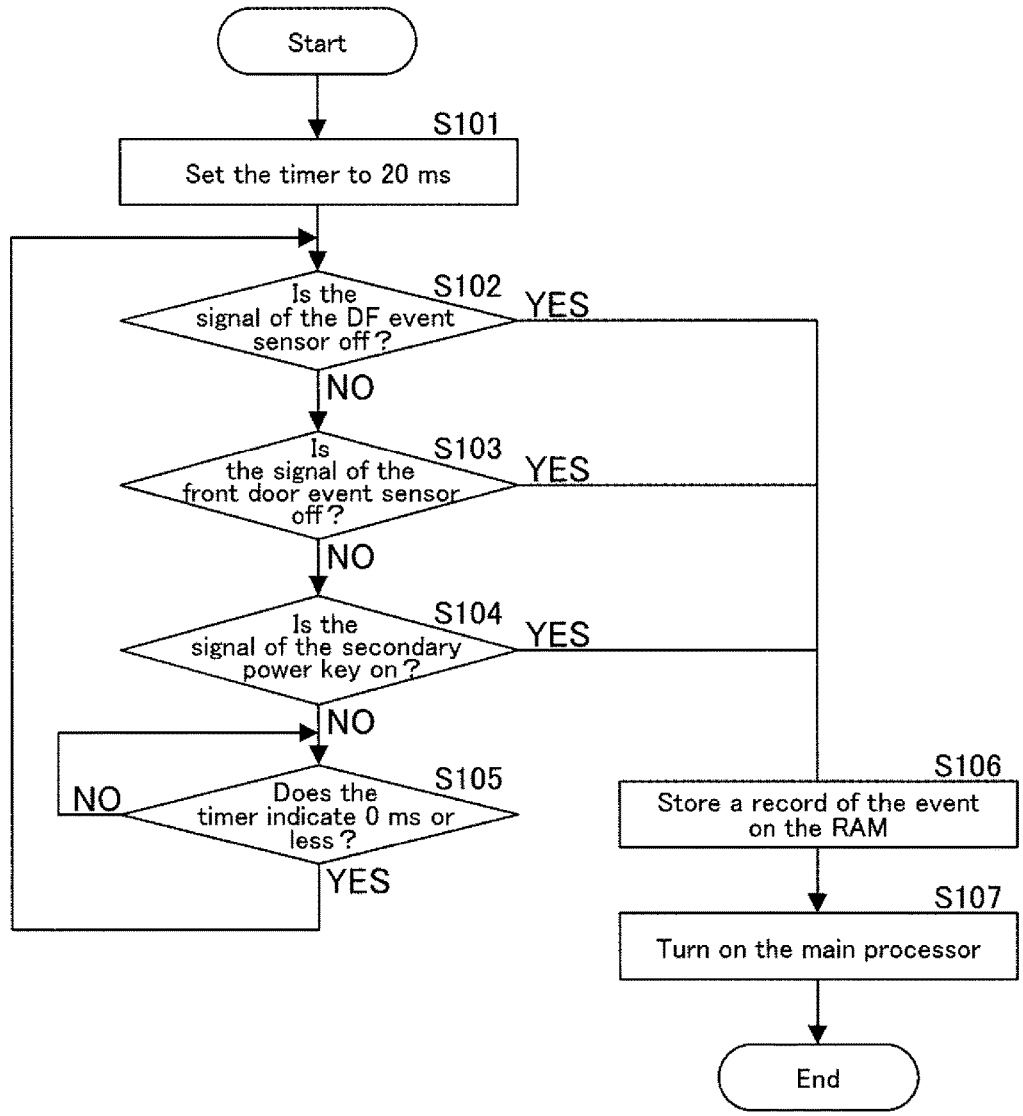
FIG. 9 is a flowchart representing the operation to be performed by the subordinate processor before the transition from sleep to normal operation.

FIG. 9 is a flowchart representing the operation to be performed by the subordinate processor 21 before the transition from sleep to normal operation.

When the mode is switched from standby to sleep, the signals of the front door event sensor 101 and the DF event sensor 102 change to on to keep the mode sleep, and the signal of the secondary power key 111 changes to off to keep the mode sleep.

Referring to the figure, the timer 127 is set to 20 ms as an initial value (Step S101). The timer 127 then starts counting down by itself.

In Step S102, it is judged whether or not the signal of the DF event sensor 102 is off, by inquiring of the input portion 125a. If it is off (YES in Step S102), this means that the signal changed from on to off; more specifically, the user opened the DF 31 to allow the apparatus to resume from sleep mode. Thus a record of the event is added to an event log table stored on the non-volatile RAM 24 (Step S106) and the main processor 22 is turned on (Step S107). Then the flowchart terminates. If it is on (NO in Step S102), this means that the signal did not change, and it is further judged whether or not the signal of the front door event sensor 101 is off, by inquiring of the input portion 125a (Step S103).

If it is off (YES in Step S103), this means that the signal changed from on to off; more specifically, the user opened the front door to allow the apparatus to resume from sleep mode. This change is recorded in the event log table stored on the non-volatile RAM 24 (Step S106). If it is on (NO in Step S103), this means that the signal did not change, and it is further judged whether or not the signal of the secondary power key 111 is on, by inquiring of the input portion 125a (Step S104).

In Step S104, if the signal of the secondary power key 111 is on (YES in Step S103), this means that the signal changed from off to on; more specifically, the user pressed the secondary power key 111 to allow the apparatus to resume from sleep mode. This change is recorded in the event log table stored on the non-volatile RAM 24 (Step S106). If it is off (NO in Step S104), this means that the signal did not change, and it is further judged whether or not the timer 127 indicates 0 ms or less (Step S105).

If it indicates 0 ms or less (YES in Step S105), this means that a monitoring period of 20 ms has elapsed, and the flowchart returns to Step S102 to wait for another event. If it indicates greater than 0 ms (NO in Step S105), the flowchart waits until it indicates 0 ms or less.

[Operation by the Subordinate Processor 21 in the in-Transition Phase]

Figure 10:
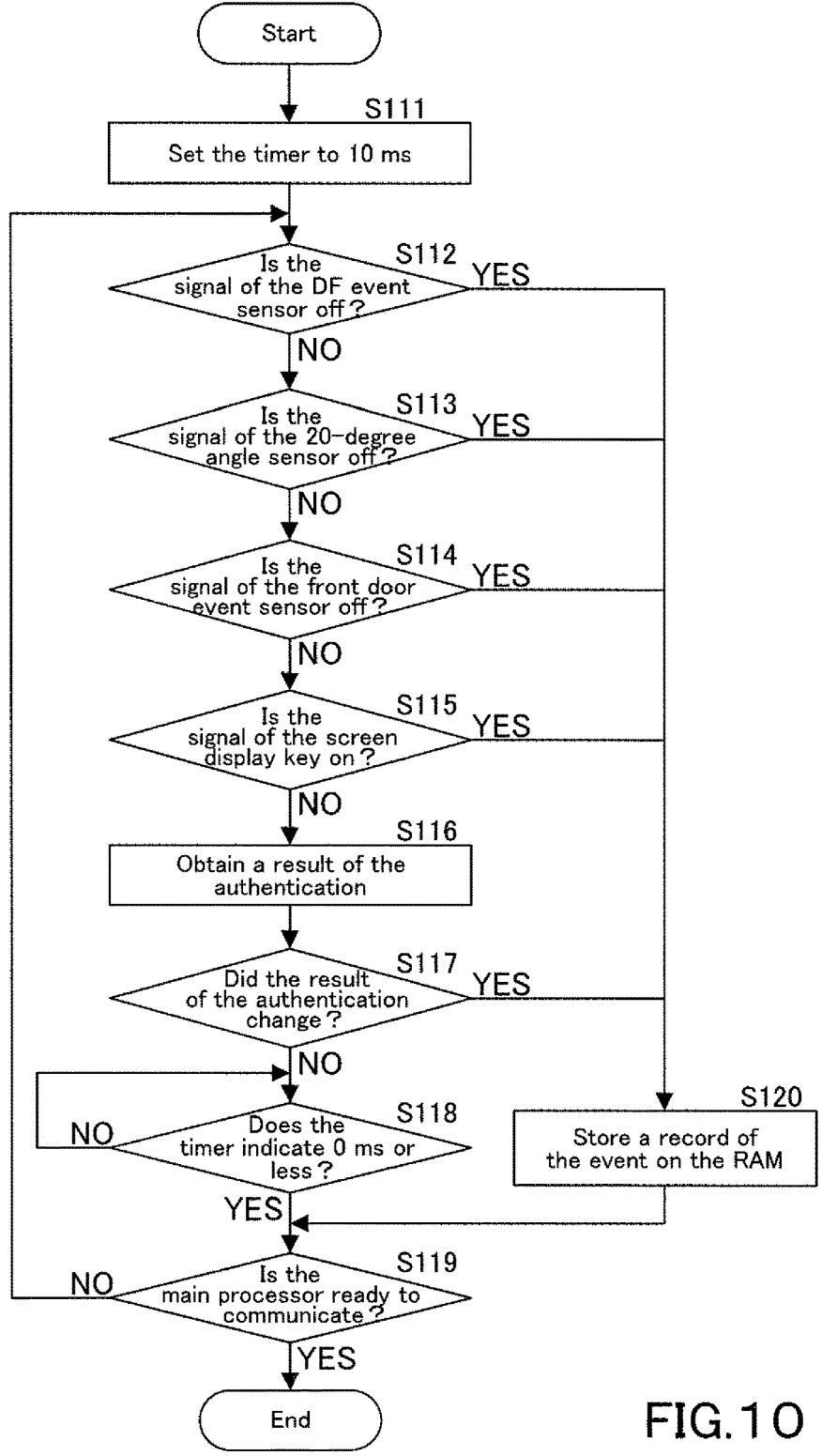
FIG. 10 is a flowchart representing the operation to be performed by the subordinate processor during the transition from sleep to normal operation.

FIG. 10 is a flowchart representing the operation to be performed by the subordinate processor 21 during the transition from sleep to normal operation.

Referring to the figure, the timer 127 is set to 10 ms, a value less than that in the operation performed before the transition from sleep to normal operation, as an initial value (Step S111). The timer 127 then starts counting down by itself. By setting the timer 127 to a value less than that in the operation performed before the transition from sleep to normal operation, as an initial value, the subordinate processor 21 can sense an event on the image processing apparatus quickly during the transition of the main CPU 124b from sleep to normal operation.

In Step S112, it is judged whether or not the signal of the DF event sensor 102 is off, by inquiring of the input portion 125a. If it is off (YES in Step S112), a record of the event is added to the event log table stored on the non-volatile RAM 24 (Step S120). Then the flowchart proceeds to Step S119.

If it is on (NO in Step S112), it is further judged whether or not the signal of the 20-degree angle sensor 103 is off, by inquiring of the input portion 125a (Step S113). If it is off (YES in Step S113), a record of the event is added to the event log table stored on the non-volatile RAM 24 (Step S120). Then the flowchart proceeds to Step S119. If it is on (NO in Step S113), it is further judged whether or not the signal of the front door event sensor 101 is off, by inquiring of the input portion 125a (Step S114).

If it is on (YES in Step S114), a record of the event is added to the event log table stored on the non-volatile RAM 24 (Step S120). Then the flowchart proceeds to Step S119. If it is on (NO in Step S114), it is further judged whether or not the signal of the screen display key 112 is on, by inquiring of the input portion 125a (Step S115).

If the signal of the screen display key 112 is on (YES in Step S115), a record of the event is added to the event log table stored on the non-volatile RAM 24 (Step S120). Then the flowchart proceeds to Step S119. If it is off (NO in Step S115), a request for a result of the authentication using an IC card, for example, is transmitted to the authentication device 104 and it is received in response (Step S116). Here, if the authentication was successful, an ID code is also received. It is further judged whether or not the result of the authentication changed, by inquiring of the data transmitter-receiver 126a (Step S117).

If the result of the authentication changed (YES in Step S117), a record of the event is added to the event log table stored on the non-volatile RAM 24 (Step S120). Then the flowchart proceeds to Step S119. If the result of the authentication did not change (NO in Step S117), it is further judged whether or not the timer 127 indicates 0 ms or less (Step S118). If it indicates greater than 0 ms (NO in Step S118), the flowchart waits until it indicates 0 ms or less. If it indicates 0 ms or less (YES in Step S118), this means that a monitoring period of 10 ms has elapsed, and the flowchart proceeds to Step S119.

In Step S119, it is judged whether or not the main processor 22 is ready to communicate. If it is not ready to communicate (NO in Step S119), the flowchart returns to Step S112 to judge the signal of the sensor. If it is ready to communicate (YES in Step S119), the flowchart terminates.

[Operation by the Subordinate Processor 21 in the Post-Transition Phase]

Figure 11:
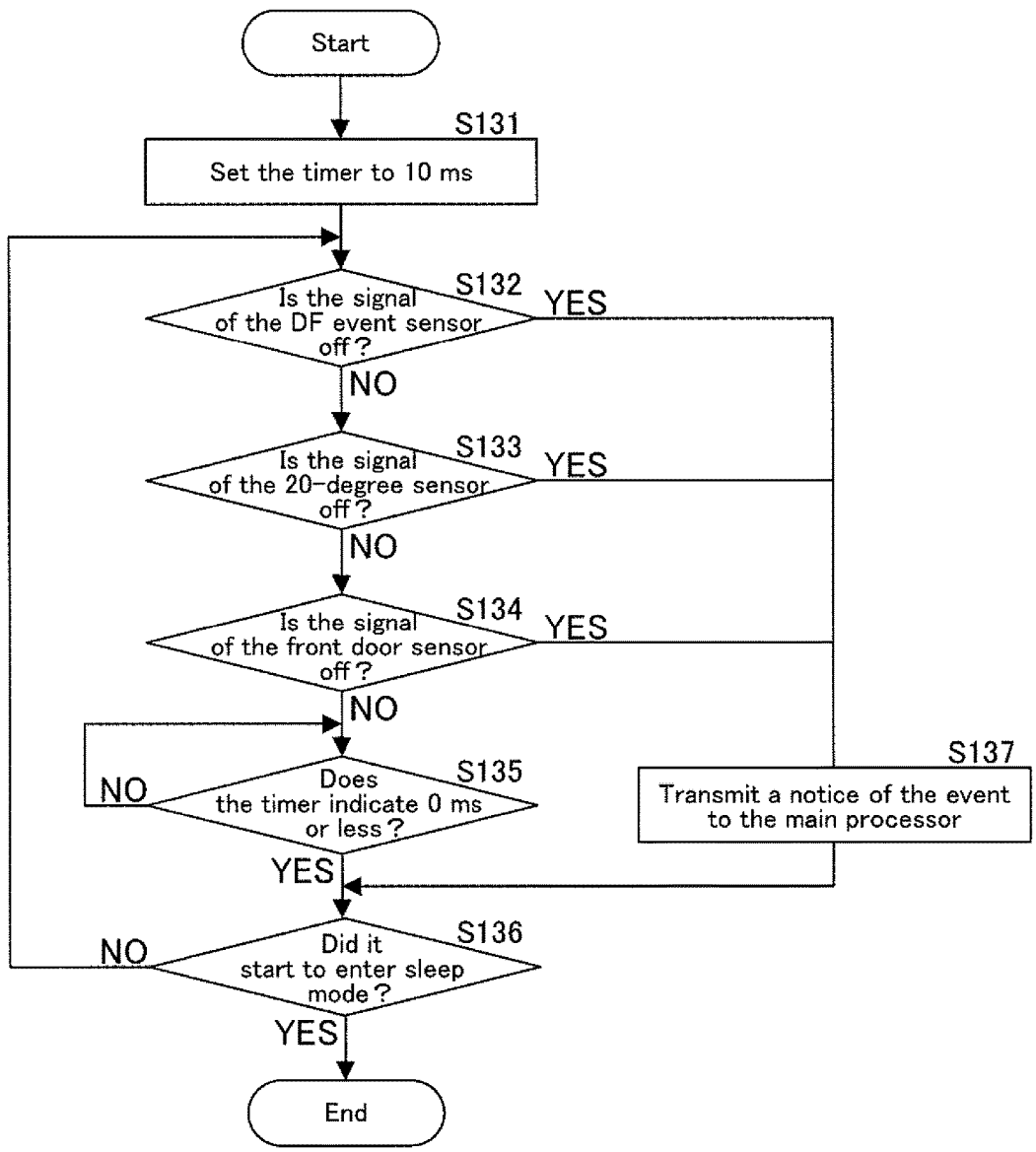
FIG. 11 is a flowchart representing the operation to be performed by the subordinate processor after the transition from sleep to normal operation.

FIG. 11 is a flowchart representing the operation to be performed by the subordinate processor 21 after the transition from sleep to normal operation.

Referring to the figure, the timer 127 is set to 10 ms, a value less than that in the operation performed before the transition from sleep to normal operation, as an initial value (Step S131). The timer 127 then starts counting down by itself.

In Step S132, it is judged whether or not the signal of the DF event sensor 102 is off, by inquiring of the input portion 125a. If it is off (YES in Step S132), a record of the event is not added to the event log table stored on the non-volatile RAM 24 but a notice is transferred to the main processor 22 (Step S137). Then it is judged whether or not it started to enter sleep mode (Step S136).

If it started to enter sleep mode (YES in Step S136), the flowchart terminates. If it did not start to enter sleep mode (NO in Step S136), the flowchart returns to Step S132.

If the signal of the DF event sensor 102 is on (NO in Step S132), it is further judged whether or not the signal of the 20-degree angle sensor 103 is off, by inquiring of the input portion 125a (Step S133).

If it is off (YES in Step S133), a notice of the event is transmitted to the main processor 22 (Step S137). If it is on (NO in Step S133), it is further judged whether or not the signal of the front door event sensor 101 is off, by inquiring of the input portion 125a (Step S134).

If it is off (YES in Step S134), a notice of the event is transmitted to the main processor 22 (Step S137). If it is on (NO in Step S134), it is further judged whether or not the timer 127 indicates 0 ms or less (Step S135).

If it indicates 0 ms or less (YES in Step S135), this means that a monitoring period of 10 ms has elapsed. Then it is judged whether or not to the subordinate processor 21 should enter sleep mode (Step S136). If it indicates greater than 0 ms (NO in Step S135), the flowchart waits until it indicates 0 ms or less.

Upon completing the initialization, the main CPU 124b of the main processor 22 is ready to operate as normal. So, the subordinate processor 21 does not store records relating to the DF event sensor 102 and other sensors and keys on the non-volatile RAM 24 but only transfers notices to the main processor 22.

After the main CPU 124b of the main processor 22 completes the initialization, the main processor 22 may judge the signals of the sensors and keys (events).

FIG. 12 is an example of an event log table stored on the non-volatile RAM 24. The table is composed of the columns titled "Log No.", "Time Stamp", and "Event". All records are deleted from the table when a notice is transferred to the main processor 22; and new records are added to the table in chronological order during the transition from sleep to normal operation. Time stamps values, provided by the timer 127, are elapsed times.

FIG. 13 is another example of the event log table shown in FIG. 12, containing a set of records classified by sensor.

[Document Size Sensing Operation by the Main Processor 22 in the in-Transition Phase]

Figure 14:
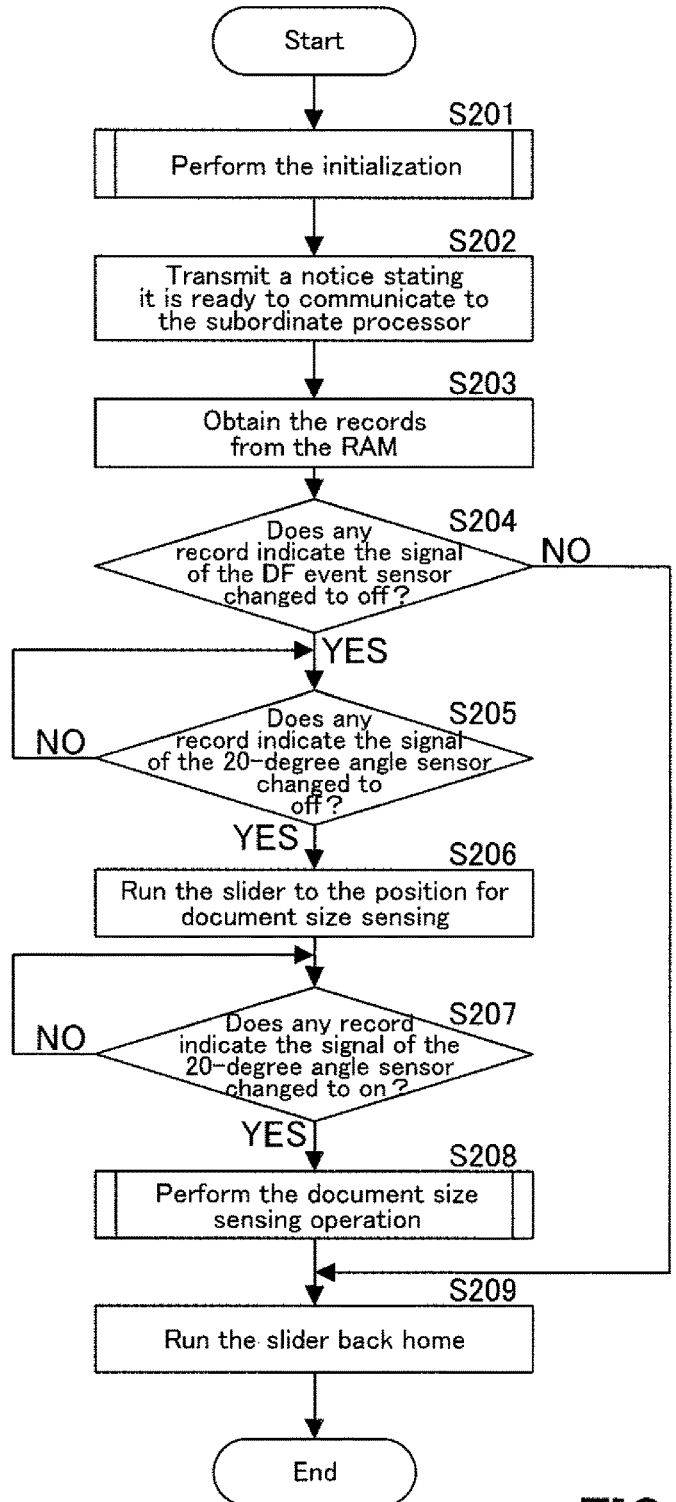
FIG. 14 is a flowchart representing the document size sensing operation to be performed by the main processor during the transition from sleep to normal operation.

FIG. 14 is a flowchart representing the document size sensing operation to be performed by the main processor 22 during the transition from sleep to normal operation.

Referring to the figure, the main processor 22 starts the initialization upon being turned on by the subordinate processor 21, and obtains shading reference data (Step S201).

The main processor 22 then completes the initialization. In Step S202, a notice stating that it is ready to communicate is transmitted to the subordinate processor 21; and all the records in the event log table are retrieved from the non-volatile RAM 24 (Step S203).

In Step S204, it is judged whether or not any of the records indicates that the signal of the DF event sensor 102 changed to off. If there is no such record (NO in Step S204), this means that the user did not open the DF 31 and there is no need for document size sensing. The slider 51 runs back to the home position to get ready for another scan (Step S209) and the flowchart terminates. If any of the records indicates that the signal of the DF event sensor 102 changed to off (YES in Step S204), this means that the user opened the DF 31, and it is further judged whether or not any of the records indicates that the signal of the 20-degree angle sensor 103 changed to off (Step S205).

If there is no record indicating that the signal of the 20-degree angle sensor 103 changed to off (NO in Step S205), the flowchart waits until such a signal is received. If any of the records indicates that the signal of the 20-degree angle sensor 103 changed to off (YES in Step S205), the slider 51 runs from the position for the shading reference plate 53 to the position for document size sensing (Step S206). It is further judged whether or not any of the records indicates that the signal of the 20-degree angle sensor 103 changed to on (Step S20′7).

If there is no record indicating that the signal of the 20-degree angle sensor 103 changed to on (NO in Step S207), the flowchart waits until such a signal is received. If any of the records indicates that the signal of the 20-degree angle sensor 103 changed to on (YES in Step S207), the document size sensing operation is performed (Step S208). The slider 51 runs back to the home position (Step S209) and the flowchart terminates.

[Document Size Sensing Operation by the Main Processor 22 in the Post-Transition Phase]

Figure 15:
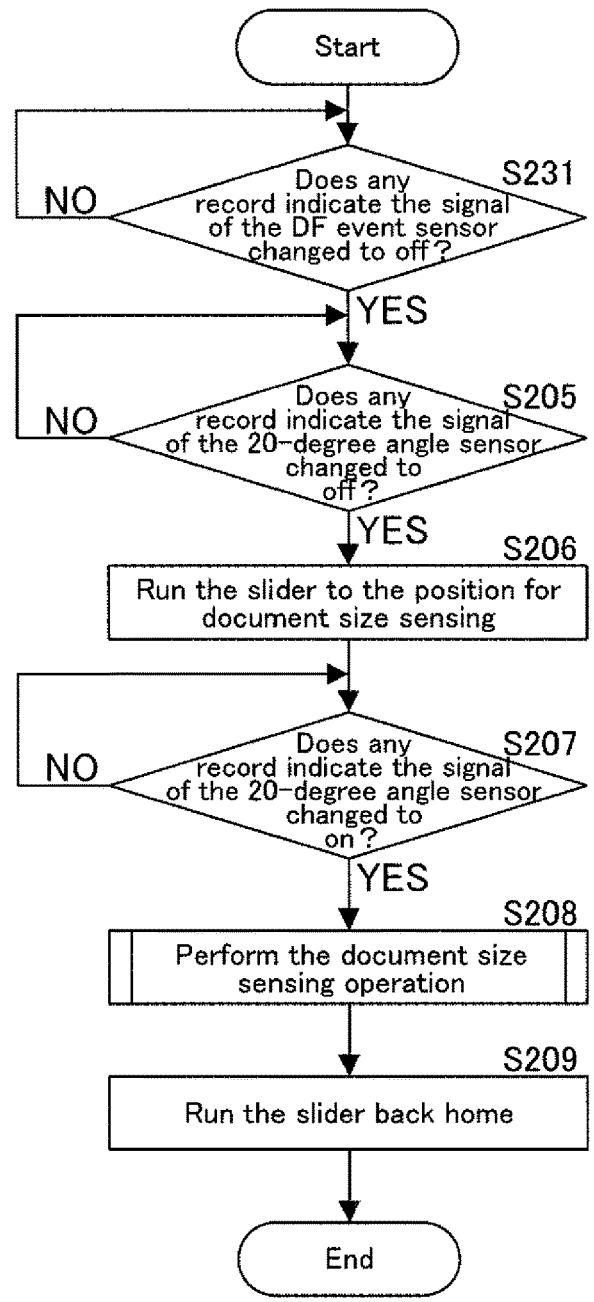
FIG. 15 is a flowchart representing the document size sensing operation to be performed by the main processor after the transition from sleep to normal operation.

FIG. 15 is a flowchart representing the document size sensing operation to be performed by the main processor 22 after the transition from sleep to normal operation.

Referring to the figure, in Step S231, it is judged whether or not any of the records indicates that the signal of the DF event sensor 102 changed to off. If there is no such record (NO in Step S231), the flowchart waits until it is retrieved. If there is such a record (YES in Step S231), this means that the user opened the DF 31, and it is further judged whether or not any of the records indicates that the signal of the 20-degree angle sensor 103 changed to off (Step S205). The following steps of this flowchart with the step numbers, Steps S206 to S209, are the same as Steps S206 to S209 of the flowchart shown in FIG. 14, representing the document size sensing operation to be performed during the transition from sleep to normal operation; so, these steps will not be described again.

Figure 16:
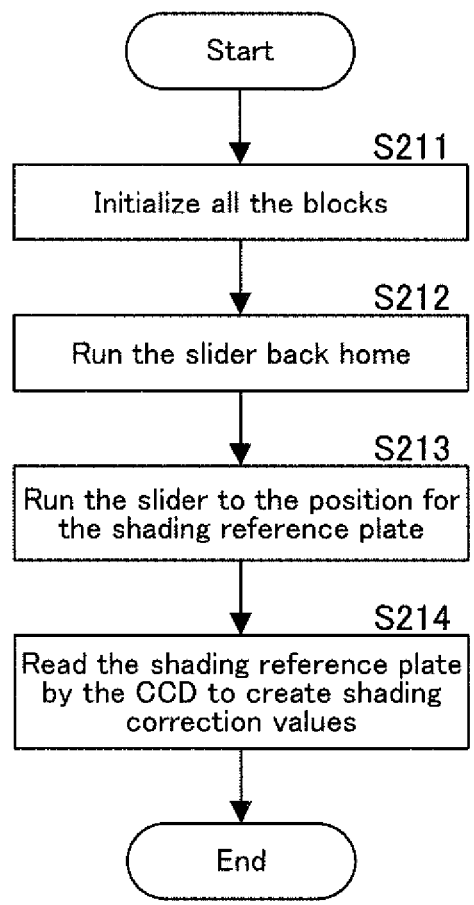
FIG. 16 is a flowchart representing a subroutine that corresponds to the initialization operation, Step S201 from the flowchart shown in FIG. 14.

FIG. 16 is a flowchart representing a subroutine that corresponds to the initialization operation, Step S201 from the flowchart shown in FIG. 14.

Referring to the figure, all the blocks including the document size sensor 132 are initialized upon the supply of power.

The slider 51 runs back to the home position that is the base position in Step S212, and then runs to the position for the shading reference plate 53 (Step S213).

In Step S214, the lamp 106 is turned on, the CCD 108 scans the shading reference plate 53, and shading correction values are created. Then the subroutine terminates.

Figure 17:
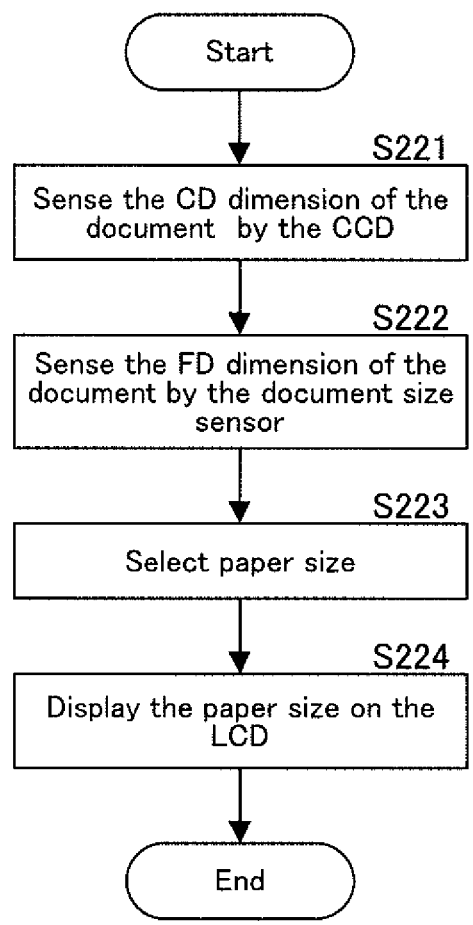
FIG. 17 is a flowchart representing a subroutine that corresponds to the document size sensing operation, Step S208 from the flowchart shown in FIG. 15.

FIG. 17 is a flowchart representing a subroutine that corresponds to the document size sensing operation, Step S208 from the flowchart shown in FIG. 15.

Referring to the figure, in Step S221, the lamp 106 is turned on, the CCD 108 scans a document, and the document size sensor 132 senses the CD dimension (main scanning dimension) of the document.

In Step S222, the document size sensor 105 senses the FD dimension (sub-scanning dimension) of the document.

In Step S223, a standard paper size most suitable for the CD and FD dimension of the document is selected. Here, a long period of time may have elapsed since a notice stating that the signal of the 20-degree angle sensor 103 is on is received, which can cause a sensor error and result in either the CD or FD dimension being successfully obtained. In this case, more than one standard paper size most suitable for the either dimension can be selected.

In Step S224, the LCD 114 shows the one or more than one paper size selected in the previous step. Then the subroutine terminates.

If there is more than one paper size option, the user will need to choose one from the list.

[Status Reset Operation by the Main Processor 22]

Figure 18:
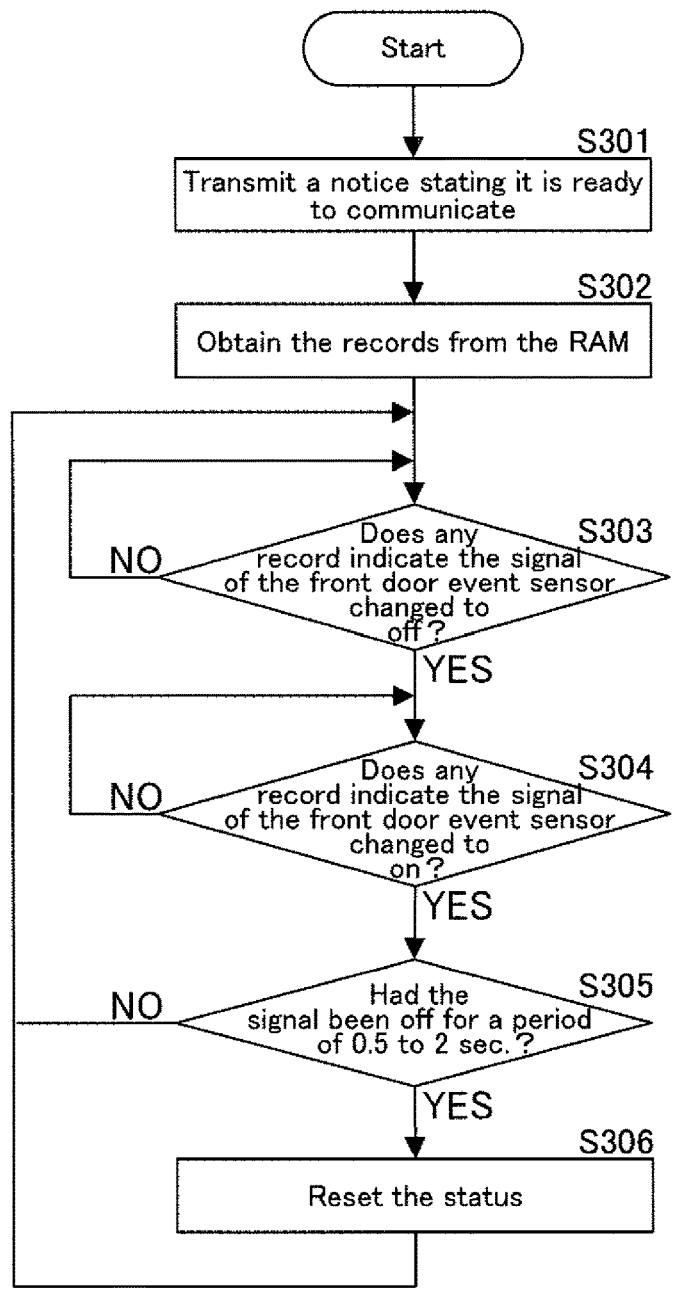
FIG. 18 is a flowchart representing the status reset operation to be performed by the main processor.

FIG. 18 is a flowchart representing the status reset operation to be performed by the main processor 22.

Referring to the figure, the main processor 22 has completed the initialization. In Step S301, a notice stating that it is ready to communicate is transmitted to the subordinate processor 21; and all the records in the event log table are retrieved from the non-volatile RAM 24 (Step S302).

In Step S303, it is judged whether or not any of the records indicates that the signal of the front door event sensor 101 changed to off. If there is no such record (NO in Step S303), the flowchart waits until it is retrieved. If there is such a record (YES in Step S303), this means that the user opened the front door, and it is further judged whether or not any of the records indicates that the signal of the front door event sensor 101 changed to on (Step S304).

If there is no record indicating that the signal of the front door event sensor 101 changed to on (NO in Step S304), the flowchart waits until such a signal is received. If any of the records indicates that the signal of the front door event sensor 101 changed to on (YES in Step S304), this means that the user closed the front door, and it is further judged whether or not the signal of the front door event sensor 101 had been off for a period of 0.5 to 2 sec. by checking the time stamp (Step S305). Here, the temporal condition for the judgment is the same as that in normal operation mode.

In Step S305, if the signal had been off for a period of 0.5 to 2 sec. (YES in Step S305), this means that the user encountered an error and is manipulating to reset the status. After the status is reset (Step S306), the flowchart returns to Step S303. In Step S305, if the signal had been off for a period of more than 2 sec. (NO in Step S305), this means that the user opened the front door for maintenance purposes. Alternatively, in Step S305, if the signal had been off for a period of less than 0.5 sec. (NO in Step S305), this means that the chattering of the magnetic closure occurred. In either case, the flowchart immediately returns to Step S303.

[Screen Display Operation by the Main Processor 22]

Figure 19:
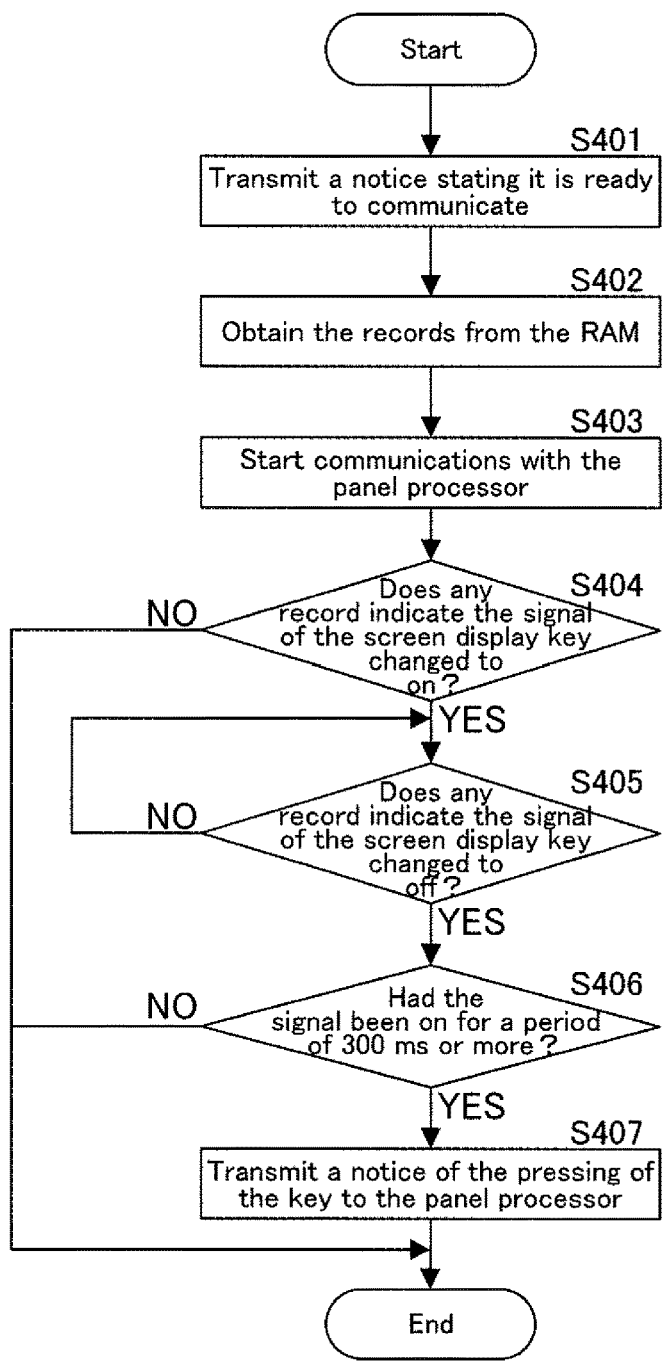
FIG. 19 is a flowchart representing the screen display operation to be performed by the main processor.

FIG. 19 is a flowchart representing the screen display operation to be performed by the main processor 22.

Referring to the figure, the main processor 22 has completed the initialization. In Step S401, a notice stating that it is ready to communicate is transmitted to the subordinate processor 21; and all the records in the event log table are retrieved from the non-volatile RAM 24 (Step S402).

In Step S403, the main processor 22 starts communication with the panel processor 23 to activate.

In Step S404, it is judged whether or not any of the records indicates that the signal of the screen display key 112 changed to on. If there is no record indicating that the signal of the screen display key 112 changed to on (NO in Step S404), this means that the user did not press the screen display key 112, and the flowchart immediately terminates. If there is such a record (YES in Step S404), this means that the user pressed the screen display key 112, and it is further judged whether or not any of the records indicates that the signal of the screen display key 112 changed to off (Step S405).

If there is no record indicating that the signal of the screen display key 112 is off (NO in Step S405), the flowchart waits until such a signal is received. If there is a record indicating that the signal of the screen display key 112 changed to off (YES in Step S405), it is further judged whether or not the signal of the screen display key 112 had been on for a period of 300 ms or more by checking the time stamp (Step S406). Here, the temporal condition for the judgment is the same as that in normal operation mode.

In Step S406, if the signal had been on for a period of 300 ms or more (YES in Step S406), this means that the user pressed the screen display key 112, and the data transmitter-receiver 126*b* transmits a notice to the panel processor 23 (Step S407). Then the flowchart terminates. If the signal had been on for a period of less than 300 ms (NO in Step S406), this means that the user accidentally pressed the key, and the flowchart immediately terminates. In normal operation mode, the panel processor 23 senses the pressing of the screen display key 112.

[Authentication Operation by the Main Processor 22]

Figure 20:
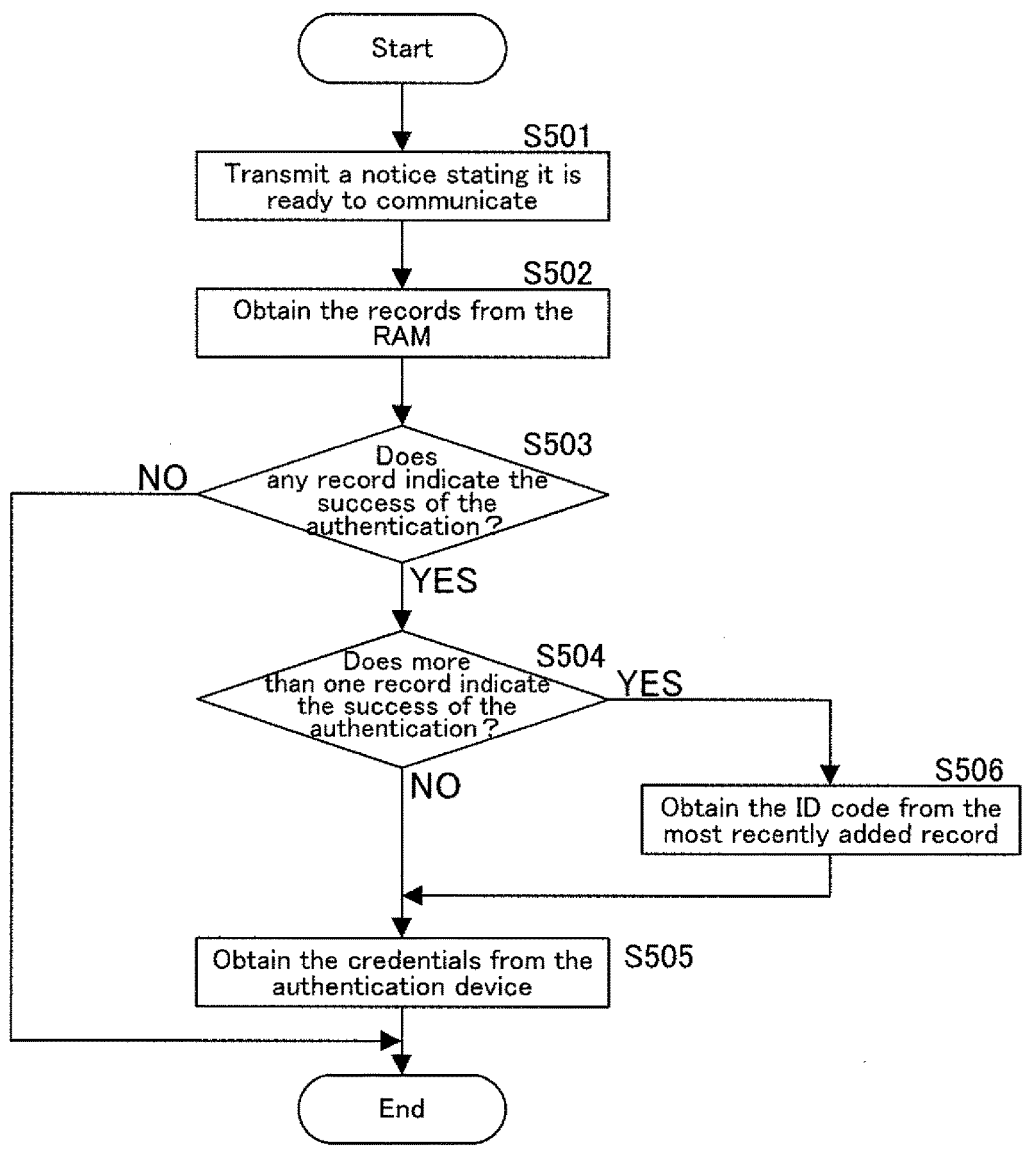
FIG. 20 is a flowchart representing the authentication operation to be performed by the main processor.

FIG. 20 is a flowchart representing the authentication operation to be performed by the main processor 22.

Referring to the figure, the main processor 22 has completed the initialization. In Step S501, a notice stating that it is read to communicate is transmitted to the subordinate processor 21; and all the records in the event log table are retrieved from the non-volatile RAM 24 (Step S502).

In Step S503, it is judged whether or not any of the records indicates authentication success; for reference, FIG. 21 shows an example of the event log table used here. If there is such a record (YES in Step S503), this means that the user has been successfully authenticated using his/her IC card, for example. It is further judged whether or not more than one record indicates authentication success (Step S504). If there is no record indicating authentication success (NO in Step S503), the flowchart immediately terminates.

In Step S504, if only one record indicates authentication success (NO in Step S504), the corresponding ID code is transferred to the authentication device 104 and the credentials are received in response (Step S505). Then the flowchart terminates. If more than one record indicates authentication success (YES in Step S504), the most recently added record in the event log table is searched for by the log number or the time stamp, and the corresponding ID code is obtained (Step S506). Then the flowchart proceeds to Step S505. In normal operation mode, the main processor 22 performs the authentication management.

Figure 22:
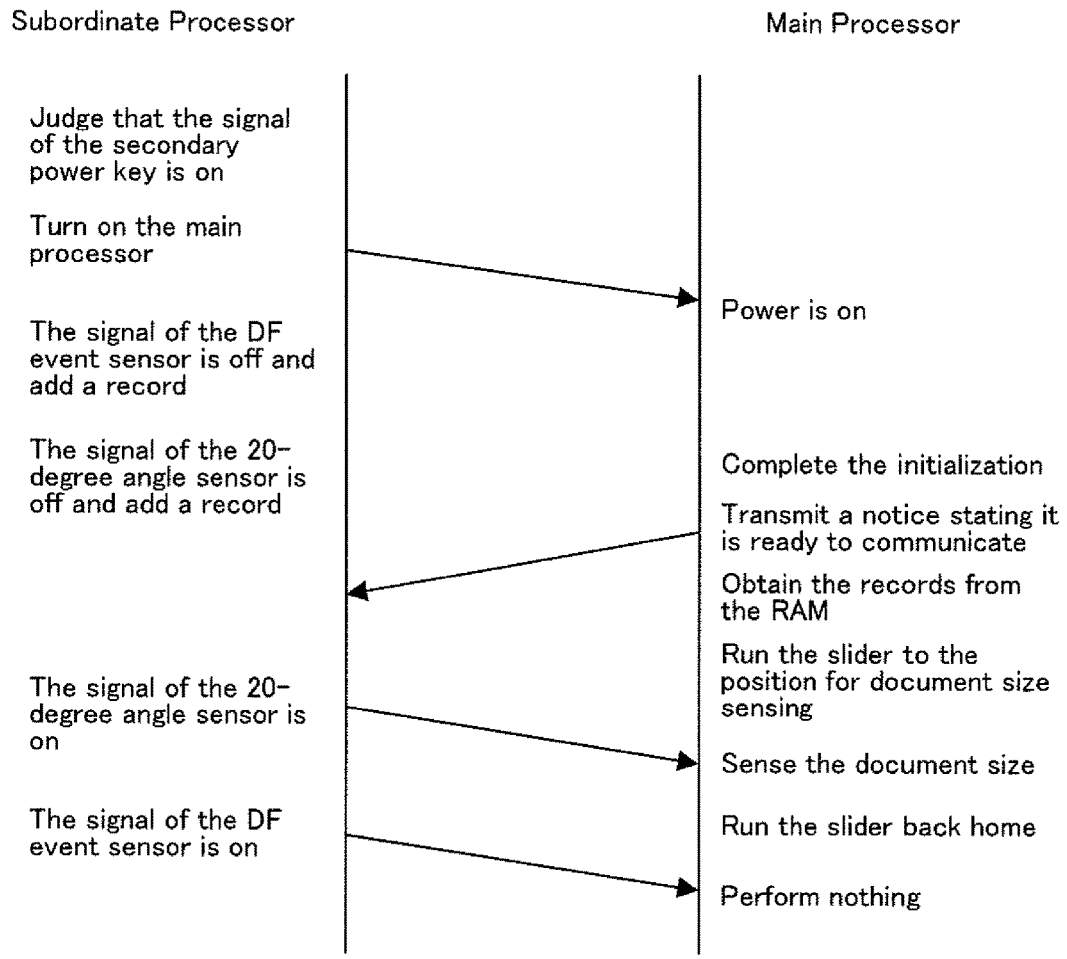
FIG. 22 is a sequence diagram showing the document size sensing operation to be performed by the subordinate processor and the main processor.

FIG. 22 is a sequence diagram showing the document size sensing operation to be performed by the subordinate processor 21 and the main processor 22.

Judging that the signal of the secondary power key 111 is on, the subordinate processor 21 turns on the main processor 22 to terminate sleep mode. Being turned on, the main processor 22 starts the initialization. Judging that the signal of the DF event sensor 102 or the 20-degree angle sensor 103 is off, the subordinate processor 21 adds a record in the event log table stored on the non-volatile RAM 24.

Completing the initialization, the main processor 22 transmits a notice stating that it is ready to communicate to the subordinate processor 21. Then the main processor 22 retrieves all the records in the event log table from the non-volatile RAM 24 and runs the slider 51 to the position for document size sensing.

Judging that the signal of the 20-degree angle sensor 103 is on, the subordinate processor 21 transmits a notice to the main processor 22; and the main processor 22 senses the document size and runs the slider 51 back to the home position. Judging that the signal of the DF event sensor 102 is on, the subordinate processor 21 transmits a notice to the main processor 22; but the main processor 22 does not perform anything.

Figure 23:
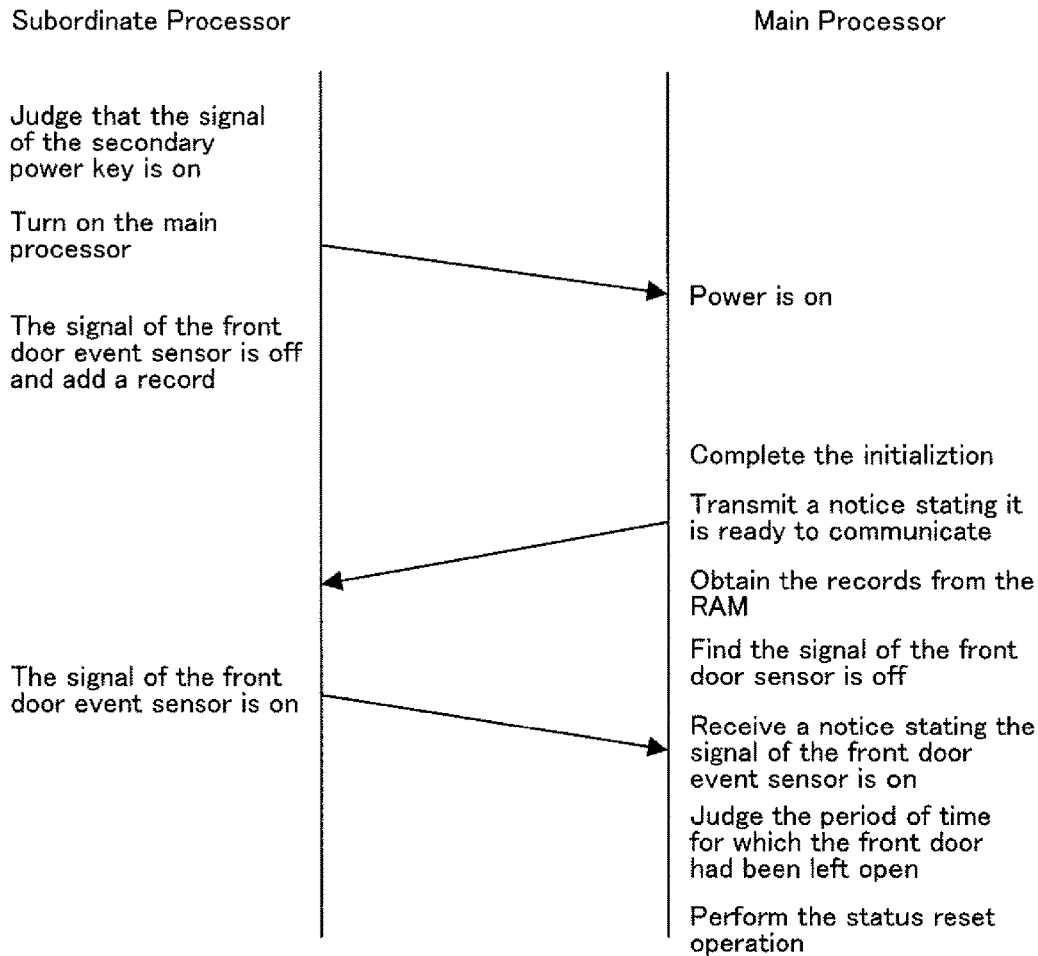
FIG. 23 is a sequence diagram showing the status reset operation to be performed by the subordinate processor and the main processor.

FIG. 23 is a sequence diagram showing the status reset operation to be performed by the subordinate processor 21 and the main processor 22.

Judging that the signal of the secondary power key 111 is on, the subordinate processor 21 turns on the main processor 22 to terminate sleep mode. Being turned on, the main processor 22 starts the initialization. Judging that the signal of the front door event sensor 101 is off, the subordinate processor 21 adds a record in the event log table stored on the non-volatile RAM 24.

Completing the initialization, the main processor 22 transmits a notice stating that it is ready to communicate to the subordinate processor 21. Then the main processor 22 retrieves all the records in the event log table from the non-volatile RAM 24 and finds that the signal of the front door sensor 101 is off.

Judging that the signal of the front door sensor 101 is on, the subordinate processor 21 transmits a notice to the main processor 22. The main processor 22 judges the period of time for which the front door had been left open and performs the status reset operation.

Figure 24:
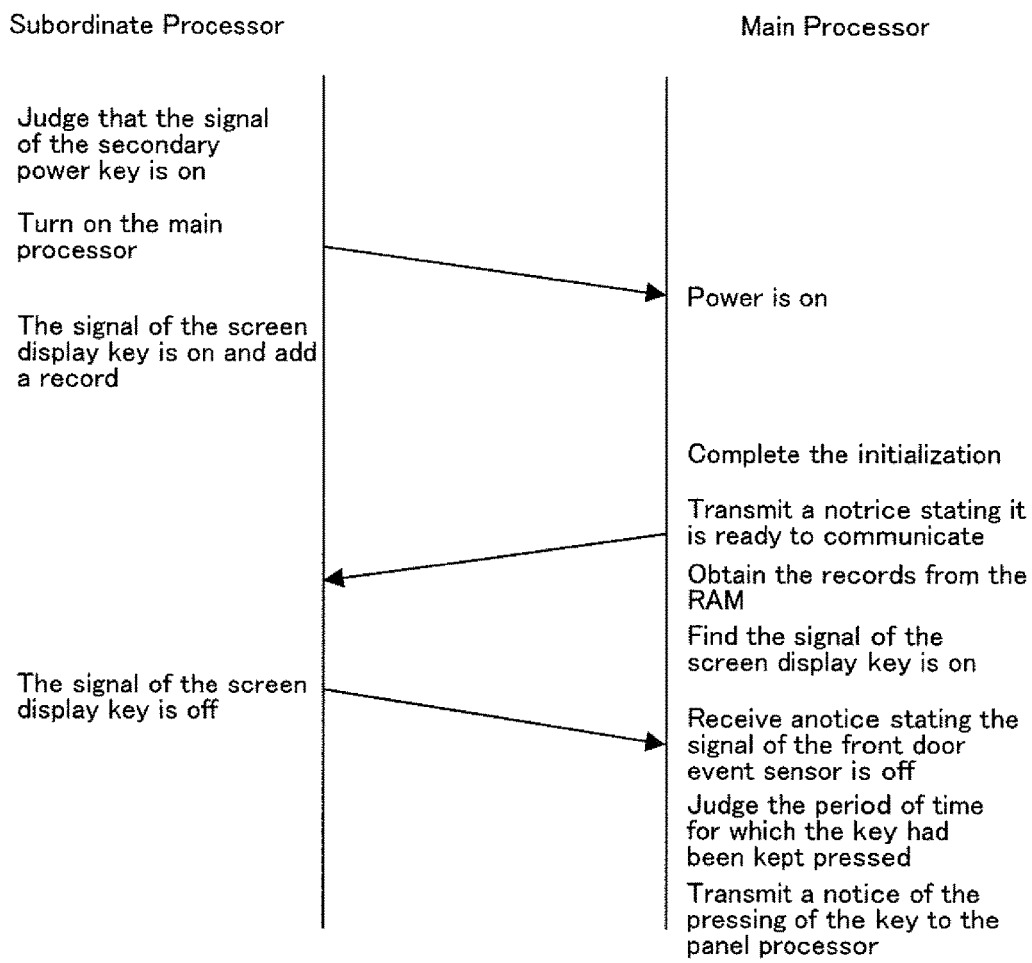
FIG. 24 is a sequence diagram showing the screen display operation to be performed by the subordinate processor and the main processor.

FIG. 24 is a sequence diagram showing the screen display operation to be performed by the subordinate processor 21 and the main processor 22.

Judging that the signal of the secondary power key 111 is on, the subordinate processor 21 turns on the main processor 22 to terminate sleep mode. Being turned on, the main processor 22 starts the initialization. Judging that the signal of the screen display key 112 is on, the subordinate processor 21 adds a record in the event log table stored on the non-volatile RAM 24.

Completing the initialization, the main processor 22 transmits a notice stating that it is ready to communicate to the subordinate processor 21. Then the main processor 22 retrieves all the records in the event log table from the non-volatile RAM 24 and finds that the signal of the screen display key 112 is on.

Judging that the signal of the screen display key 112 is off, the subordinate processor 21 transmits a notice to the main processor 22. The main processor 22 judges the period of time for which the screen display key 112 had been kept pressed and transmits a notice of the pressing of the screen display key 112 to the panel processor 23.

Figure 25:
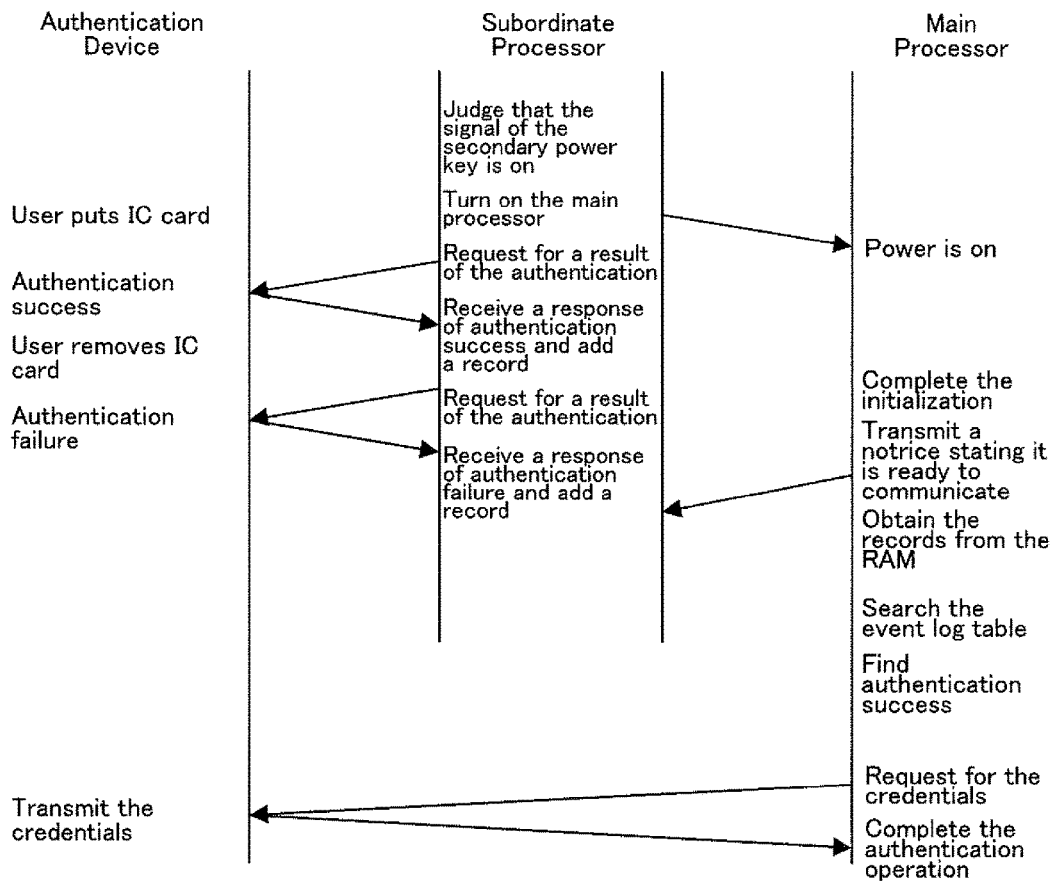
FIG. 25 is a sequence diagram showing the authentication operation to be performed by the subordinate processor, the main processor, and an authentication device.

FIG. 25 is a sequence diagram showing the authentication operation to be performed by the subordinate processor 21, the main processor 22, and the authentication device 104.

Judging that the signal of the secondary power key 111 is on, the subordinate processor 21 turns on the main processor 22 to terminate sleep mode. Being turned on, the main processor 22 starts the initialization.

When the user puts his/her IC card, the authentication device 104 performs authentication. Until the main processor 22 completes the initialization, the subordinate processor 21 repeatedly transmits a request for a result of the authentication to the authentication device 104. If the authentication was successful, the subordinate processor 21 receives a response indicating authentication success. When the user withdraws his/her IC card, the authentication device 104 does not perform authentication, and the subordinate processor 21 receives a response indicating authentication failure. Every time it receives a response indicating authentication success or failure, the subordinate processor 21 adds a record in the event log table stored on the non-volatile RAM 24.

Completing the initialization, the main processor 22 transmits a notice stating that it is ready to communicate to the subordinate processor 21. Then the main processor 22 retrieves all the records in the event log table from the non-volatile RAM 24 and searches for any record indicating authentication success. If there is such a record, the main processor 22 obtains the user's credentials from the authentication device 104. The authentication operation is thus completed.

[Table Access Control Operation by the Subordinate Processor 21]

Figure 26:
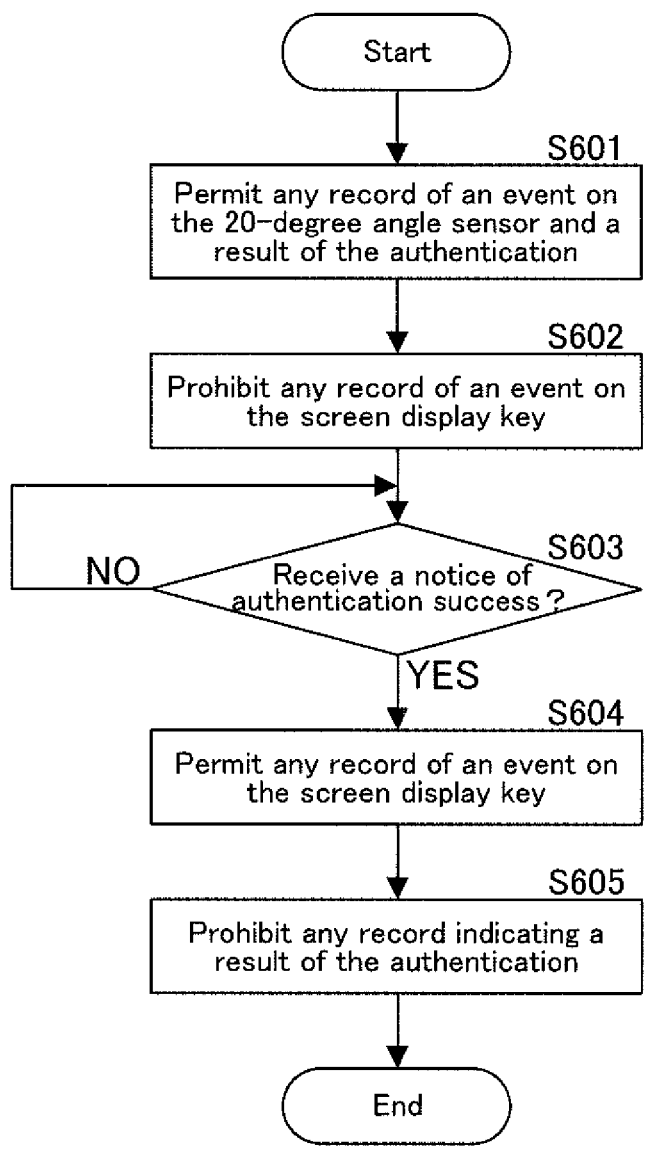
FIG. 26 is a flowchart representing the table access control operation to be performed by the subordinate processor.

FIG. 26 is a flowchart representing the table access control operation to be performed by the subordinate processor 21.

In Step S601, any records of an event on the 20-degree angle sensor 103 and a result of the authentication are permitted to be added to the event log table stored on the non-volatile RAM 24.

Since the screen display key 112 serves to retrieve a screen associated with the user, the user must be successfully authenticated for the sake of security. In Step S602, unless the user is successfully authenticated, any record of an event on the screen display key 112 is prohibited from being added to the table. That means, the access to the event log table is prohibited in regard to the key.

In Step S603, it is judged whether or not a response indicating authentication success is received. If it is not on (NO in Step S603), the flowchart waits until it is received. If it is received (YES in Step S603), this means that the user is successfully authenticated, and any record of an event on the screen display key 112 is permitted to be added to the table in Step S604.

Since the user has been successfully authenticated, any record indicating a result of the authentication is not necessary anymore. To take a load off the subordinate processor 21, such a record is prohibited from being added to the event log table in Step S605. This means, the access to the event log table is prohibited in regard to the authentication.

As described above, unless the user is successfully authenticated, a record of an event on the 20-degree angle sensor 103 (the document cover) can be stored on the non-volatile RAM 24, but a record of an event on the screen display key 112 (the pressing of the key) cannot be stored on the non-volatile RAM 24. In other words, any user having not been successfully authenticated will be unable to view the user's registered screen even by pressing the screen display key 112, which is reasonable.

The successfully authenticated user may manipulate again for the authentication, but a record indicating authentication success or failure will not be stored on the non-volatile RAM 24. This will take a load off the subordinate processor 21 and keep as much free space as possible in the non-volatile RAM 24 without duplicate information.

[Variation 1 of the Operation by the Subordinate Processor 21 in the in-Transition Phase]

Figure 27:
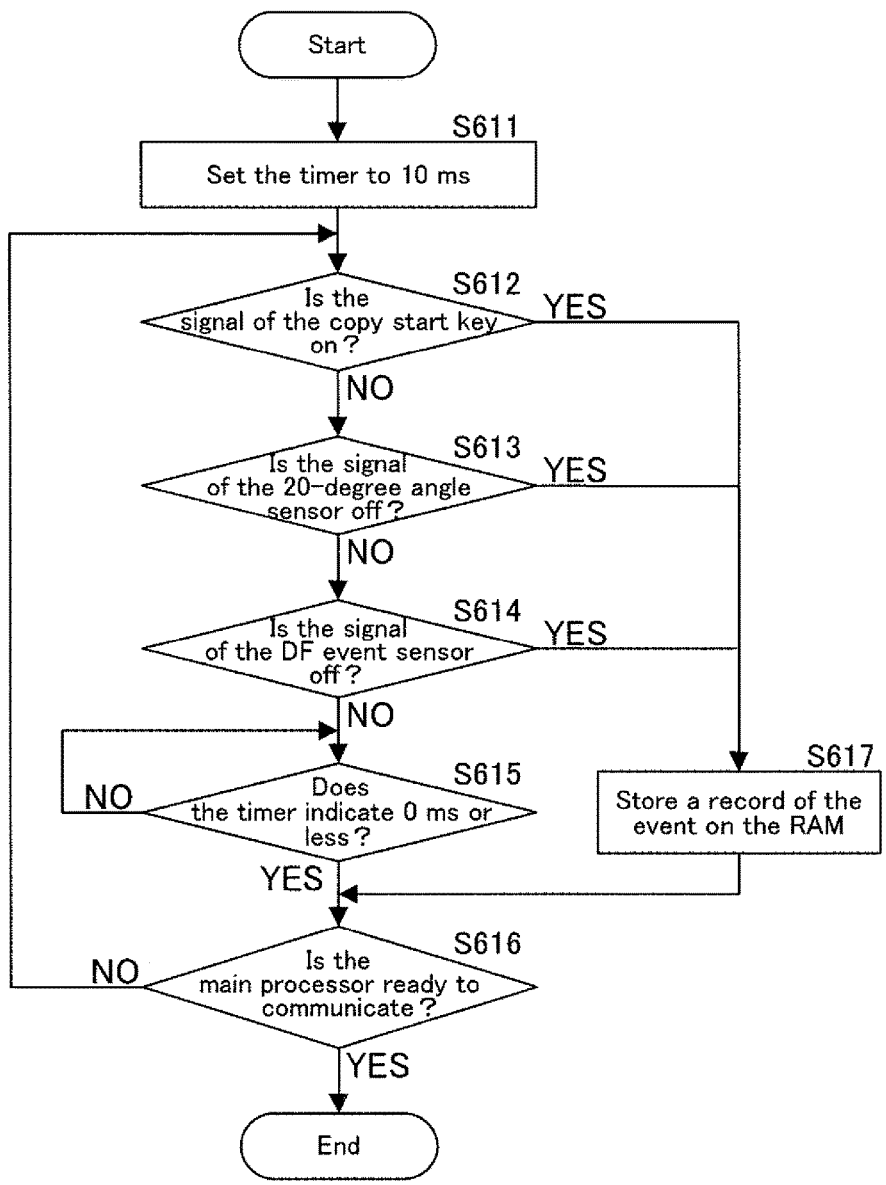
FIG. 27 is a flowchart representing another example of the operation to be performed by the subordinate processor during the transition from sleep to normal operation.

FIG. 27 is a flowchart representing another example of the operation to be performed by the subordinate processor 21 during the transition from sleep to normal operation.

Referring to the figure, the timer 127 is set to 10 ms, a value less than that in the operation performed before the transition from sleep to normal operation, as an initial value (Step S611). The timer 127 then starts counting down by itself.

In Step S612, it is judged whether or not the signal of the copy start key 113 is on, by inquiring of the input portion 125a. If it is on (YES in Step S612), a record of the event is added to the event log table stored on the non-volatile RAM 24 (Step S617). Then the flowchart proceeds to Step S616.

If it is off (NO in Step S612), it is further judged whether or not the signal of the 20-degree angle sensor 103 is off, by inquiring of the input portion 125a (Step S613). If it is off (YES in Step S613), a record of the event is added to the event log table stored on the non-volatile RAM 24 (Step S617). Then the flowchart proceeds to Step S614. If it is on (NO in Step S613), it is further judged whether or not the signal of the DF event sensor 102 is off, by inquiring of the input portion 125a (Step S614).

If it is off (YES in Step S614), a record of the event is added to the event log table stored on the non-volatile RAM 24 (Step S617). Then the flowchart proceeds to Step S616. If it is on (NO in Step S614), it is further judged whether or not the timer 127 indicates 0 ms or less (Step S615). If it indicates greater than 0 ms (NO in Step S615), the flowchart waits until it indicates 0 ms or less. If it indicates 0 ms or less (YES in Step S615), this means that a monitoring period of 10 ms has elapsed, and the flowchart proceeds to Step S616.

In Step S616, it is judged whether or not the main processor 22 is ready to communicate. If it is not ready to communicate (NO in Step S616), the flowchart returns to Step S612 to judge the signal of the copy start key 113. If it is ready to communicate (YES in Step S616), the flowchart terminates.

In the variation shown in FIG. 27, the main processor 22 is allowed to start copy automatically after the transition from sleep to normal operation, as to be described later. So, the user does not have to press the copy start key 113 again.

[Copy Start Operation to be Performed by the Main Processor 22]

Figure 28:
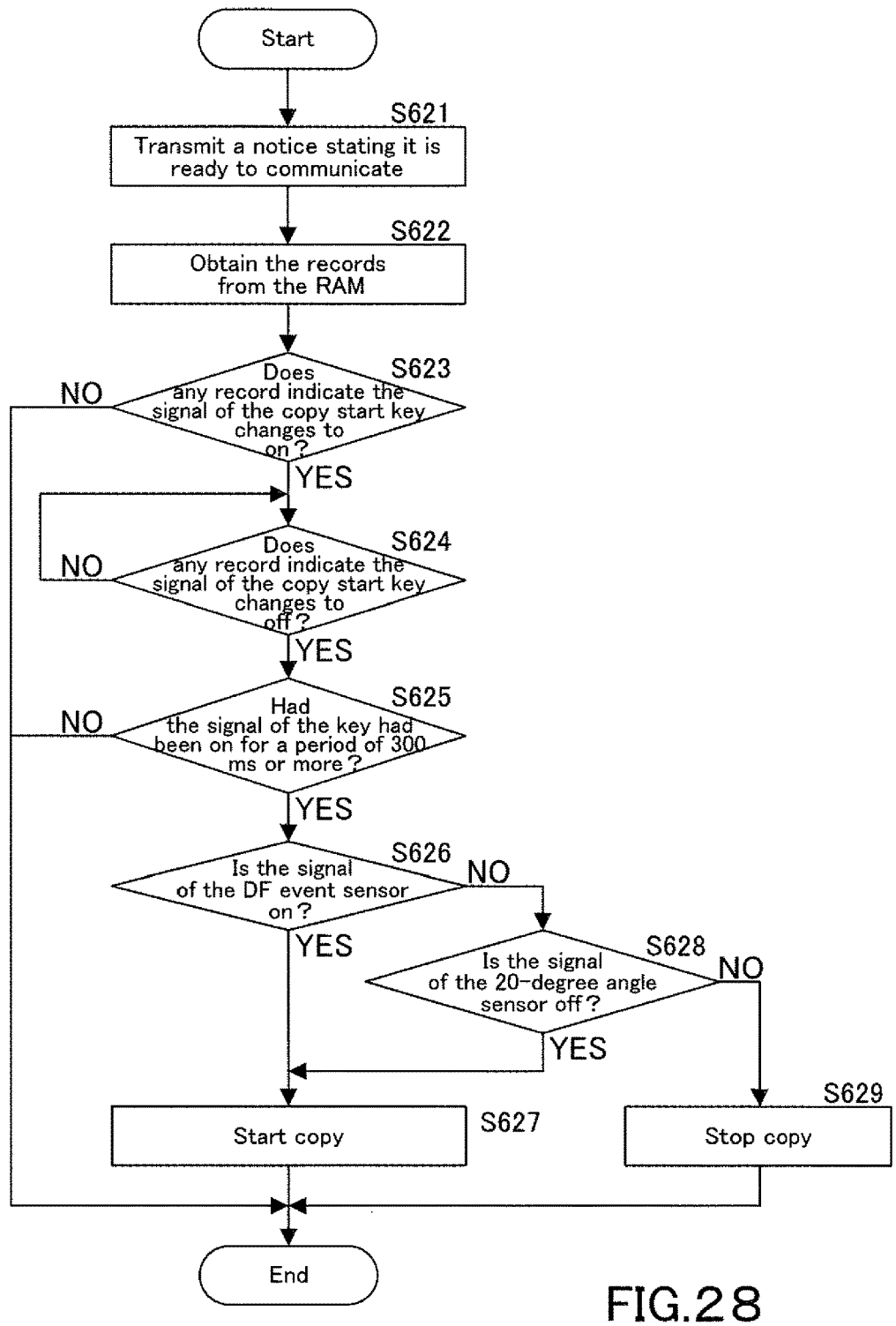
FIG. 28 is a flowchart representing the copy start operation to be performed by the main processor.

FIG. 28 is a flowchart representing the copy start operation to be performed by the main processor 22.

The main processor 22 has completed the initialization. In Step S621, a notice stating that it is ready to communicate is transmitted to the subordinate processor 21; and all the records in the event log table are retrieved from the non-volatile RAM 24 (Step S622).

In Step S623, it is judged whether or not any of the records indicates that the signal of the copy start key 113 changed to on. If there is no such record (NO in Step S623), this means that the user did not press the copy start key 113, and the flowchart immediately terminates. If any of the records indicates that the signal of the copy start key 113 changed to on (YES in Step S623), it is further judged whether or not any of the records indicates that the signal of the copy start key 113 changed to off (Step S624).

If there is no record indicating that the signal changed to off (NO in Step S624), the flowchart waits until such a signal is received. If any of the records indicates that the signal changed to off (YES in Step S624), it is further judged in Step S625 whether or not the signal of the copy start key 113 had been on for a period of 300 ms or more by checking the time stamp. If the signal had been on for a period of less than 300 ms (NO in Step S625), this means that the user accidentally pressed the copy start key 113, and the flowchart immediately terminates.

If the signal had been on for a period of 300 ms or more (YES in Step S625), it is further judged whether or not the signal of the DF event sensor 102 is on (Step S626). If it is on (YES in Step S626), the copy operation starts in Step S627. If it is off (NO in Step S626), it is further judged in Step S628 whether or not the signal of the 20-degree angle sensor 103 is off.

If it is off (YES in Step S628), the copy operation starts in Step S627. If it is on (NO in Step S628), the copy operation stops in Step S629. If the signal of the DF open-close sensor 102 is on (changes from off to on), this means that the document has been left on the DF 31 possibly since before the main processor 22 resumed from sleep mode, and the copy operation stops for the sake of security. Similarly, if the signal of the 20-degree angle sensor 103 is not on (changes from off to on), this means that the document has been left on the platen glass possibly since before the main processor 22 resumed from sleep mode, and the copy operation stops for the sake of security.

[Variation 2 of the Operation by the Subordinate Processor 21 in the in-Transition Phase]

Figure 29:
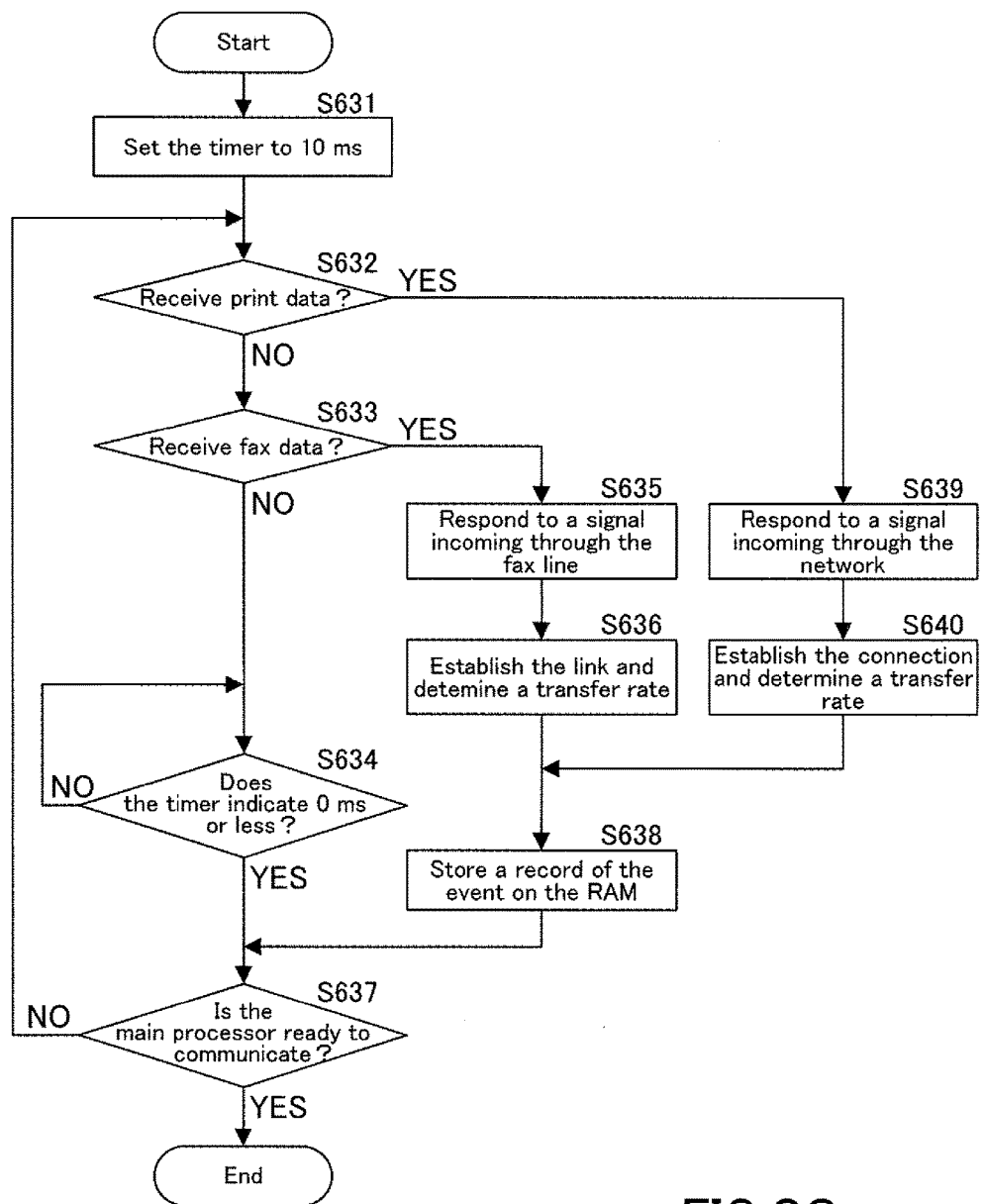
FIG. 29 is a flowchart representing yet another example of the operation to be performed by the subordinate processor during the transition from sleep to normal operation.

FIG. 29 is a flowchart representing yet another example of the operation to be performed by the subordinate processor 21 during the transition from sleep to normal operation.

Referring to the figure, the timer 127 is set to 10 ms, a value less than that in the operation performed before the transition from sleep to normal operation, as an initial value (Step S631). The timer 127 then starts counting down by itself.

In Step S632, it is judged whether or not print data is received, by inquiring of the data transmitter-receiver 126a. If print data is received (YES in Step S632), a response is transmitted through the LAN by the subordinate processor 21 acting as a proxy in Step S639. The connection is established and a transfer rate is determined in Step S640; and a record of the event is added to the event log table stored on the non-volatile RAM 24 in Step S638. Then the flowchart proceeds to Step S637.

In Step S632, if print data is not received (NO in Step S632), it is further judged whether or not fax data is received, by inquiring of the fax transmitter-receiver 129a (Step S613). If fax data is received (YES in Step S633), a response is transmitted through the fax line by the subordinate processor 21 acting as a proxy in Step S635. The connection is established and a transfer rate is determined in Step S636; and a record of the event is added to the event log table stored on the non-volatile RAM 24 in Step S638. Then the flowchart proceeds to Step S637.

In Step S633, if fax data is not received (NO in Step S633), it is further judged whether or not the timer 127 indicates 0 ms or less (Step S634). If it indicates greater than 0 ms (NO in Step S634), the flowchart waits until it indicates 0 ms or less. If it indicates 0 ms or less (YES in Step S634), this means that a monitoring period of 10 ms has elapsed, and the flowchart proceeds to Step S637.

In Step S637, it is judged whether or not the main processor 22 is ready to communicate. If it is not ready to communicate (NO in Step S637), the flowchart returns to Step S632 to wait for print data to be received. If it is ready to communicate (YES in Step S637), the flowchart terminates.

[Print Data Receiving Operation by the Main Processor 22]

Figure 30:
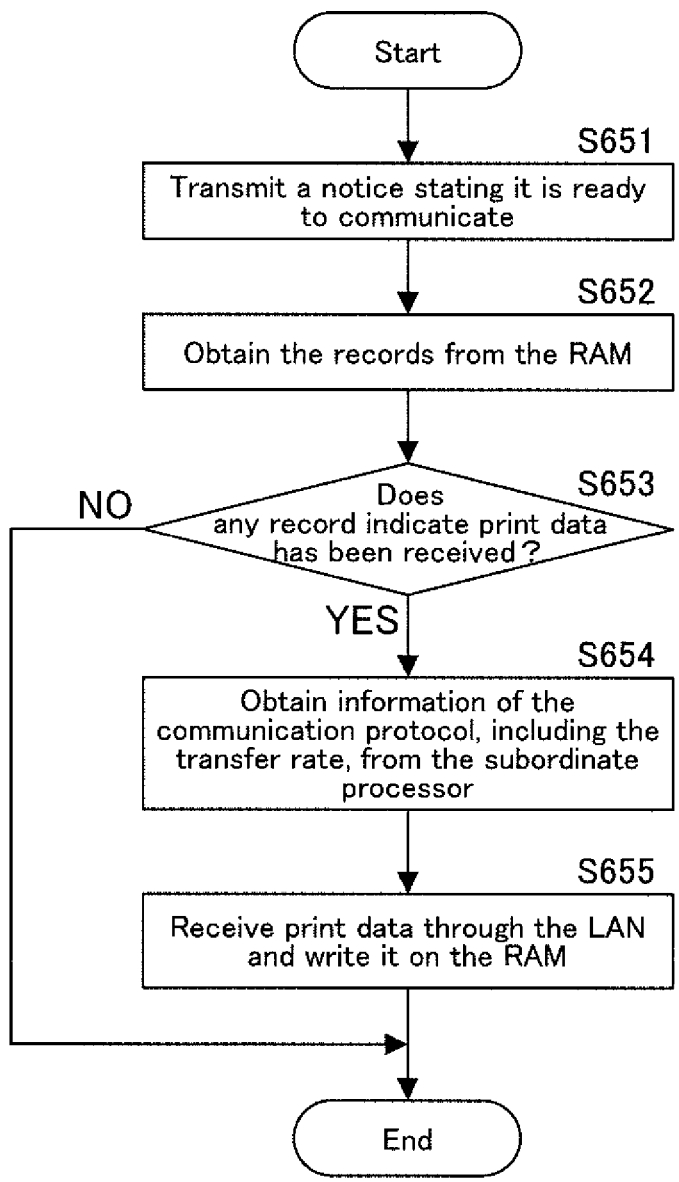
FIG. 30 is a flowchart representing the print data receiving operation to be performed by the main processor.

FIG. 30 is a flowchart representing the print data receiving operation to be performed by the main processor 22.

The main processor 22 has been completed the initialization. In Step S651, a notice stating that it is ready to communicate is transmitted to the subordinate processor 21; and all the records in the event log table are retrieved from the non-volatile RAM 24 (Step S652).

In Step S653, it is judged whether or not any of the records indicates that print data has been received. If there is no such record (NO in Step S653), the flowchart terminates. If any of the records indicates that print data has been received (YES in Step S653), information about the communications protocol, including the transfer rate, is obtained from the subordinate processor 21 in Step S654. In Step S655, print data is received through the LAN and written into the RAM 123b.

As described above, the user may transmit print data from an external apparatus to the image processing apparatus during the transition of the main processor 22 from sleep to normal operation; even in this case, the image processing apparatus is allowed to obtain the print data and print automatically. So, the user does not have to transmit the print data again.

[Fax Data Receiving Operation by the Main Processor 22]

Figure 31:
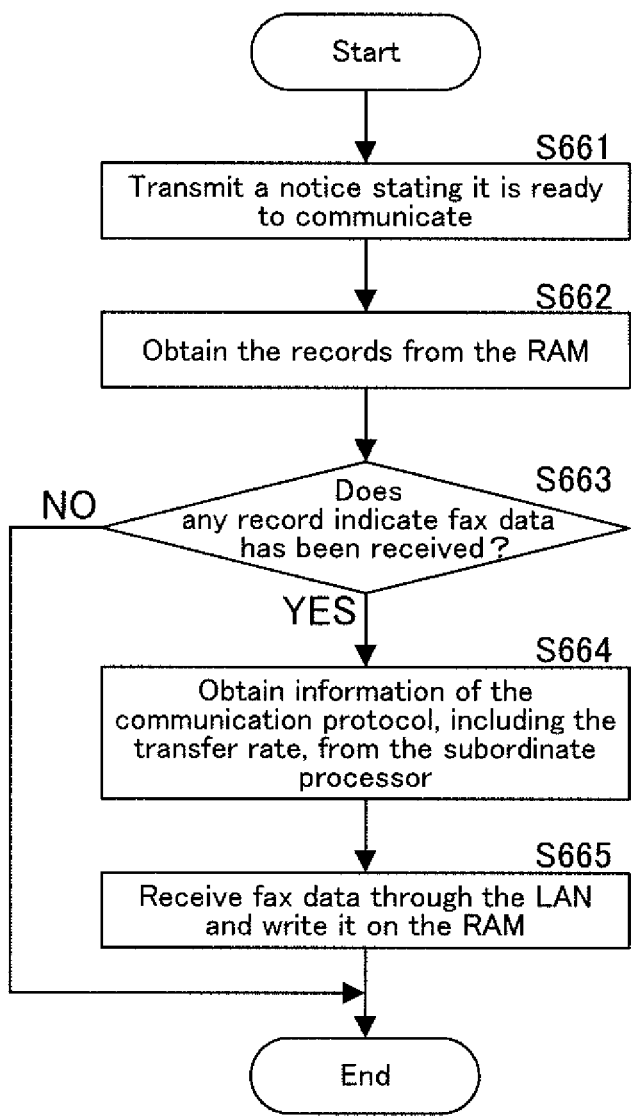
FIG. 31 is a flowchart representing the fax data receiving operation to be performed by the main processor.

FIG. 31 is a flowchart representing the fax data receiving operation to be performed by the main processor 22.

The main processor 22 has completed the initialization. In Step S661, a notice stating that it is ready to communicate is transmitted to the subordinate processor 21; and all the records in the event log table are retrieved from the non-volatile RAM 24 (Step S662).

In Step S663, it is judged whether or not any of the records indicates that fax data has been received. If there is no such record (NO in Step S663), the flowchart terminates. If any of the records indicates that fax data has been received (YES in Step S663), information about the communications protocol, including the transfer rate, is obtained from the subordinate processor 21 in Step S664. In Step S665, fax data is received through the fax line and written into the RAM 123b.

As described above, the user may transmit fax data to the image processing apparatus through the fax line during the transition of the main processor 22 from sleep to normal operation; even in this case, the image processing apparatus is allowed to obtain the fax data and print automatically. So, the user does not have to transmit the fax data again.

As described above, in this embodiment, the subordinate processor 21 (the subordinate CPU 124a) judges whether or not an event occurs on the image processing apparatus, by inquiring of the front door event sensor 101, the DF event sensor 102, the 20-degree angle sensor 103, the screen display key 112, the copy start key 113, and other sensing means, at predetermined intervals during the transition of the main processor 22 (the main CPU 124b) from sleep to normal operation. If an event occurs, the subordinate processor 21 further stores a record of the event on the non-volatile RAM 24. After the transition, the main processor 22 retrieves the record from the non-volatile RAM 24 and performs processing using it. The main processor 22 is thus allowed to behave as if the event had occurred in normal operation mode. So, the user does not have to manipulate again. By reacting to the user's desire in a mechanical manner as described above, the image processing apparatus has enhanced the convenience.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
   one or more than one sensor that senses an event on the image processing apparatus;
   a first memory;
   a main CPU that loses power supply while sleep mode is on; and
   a subordinate CPU that receives power supply even while sleep mode is on, wherein:
the subordinate CPU performs: terminating sleep mode based on the one or more than one sensor detecting a first event to begin a transition of the main CPU from sleep to normal operation; determining whether a second event occurs after the first event on the image processing apparatus by inquiring of the one or more than one sensor, at predetermined intervals during the transition of the main CPU from sleep to normal operation; and responsive to a determination that the second event occurs, storing on the first memory the second event; and after the transition, the main CPU retrieves the second record from the first memory and performs processing using it.

2. The image processing apparatus according to claim 1, wherein after sleep mode is terminated, the subordinate CPU makes the determination at the predetermined intervals during the transition, the predetermined intervals being shorter than those in sleep mode.

3. The image processing apparatus according to claim 1, further comprising:
a document cover event sensor that senses opening and closing of a document cover for covering a platen, the document cover event sensor serving as the one or more than one sensor;
a first document size sensor that senses a main scanning dimension of a document set on the platen, by inquiring of a document reader that reads the document; and
a second document size sensor that senses a sub-scanning dimension of the document, wherein:
the subordinate CPU stores on the first memory the second event as being an event sensed by the document cover event sensor, the event being the opening and closing of the document cover; and
after the transition, the main CPU performs: retrieving the second event from the first memory, the record second event indicating the opening and closing of the document cover; and judging the size of the document with reference to the main scanning and sub-scanning dimensions having being sensed by the first and second document size sensors during the transition of the main CPU to normal operation.

4. The image processing apparatus according to claim 1, further comprising a front door event sensor that senses opening and closing of a front door of the image processing apparatus, the front door event sensor serving as the one or more than one sensor, wherein:
the subordinate CPU stores on the first memory the second event as being an event sensed by front door event sensor, the event being the opening and closing of the front door; and
after the transition, the main CPU retrieves the second event from the first memory, the second event indicating the opening and closing of the front door, and resets status.

5. The image processing apparatus according to claim 1, further comprising:
an operation panel having a screen display key for displaying a registered screen;
a screen display key-pressing sensor that senses pressing of the screen display key, the screen display key-pressing sensor serving as the one or more than one sensor; and
a panel processor that controls a set of hardware keys including the screen display key of the operation panel as instructed by the main CPU, wherein:
the subordinate CPU stores on the first memory the second event as being an event sensed by the screen display key-pressing sensor, the event being the pressing of the screen display key; and
after the transition, the main CPU retrieves the second event the first memory, the second event indicating the pressing of the screen display key, and transmits a notice to the panel processor.

6. The image processing apparatus according to claim 1, further comprising an authentication sensor that senses success or failure of authentication provided by an authentication device that performs user authentication, the authentication sensor serving as the one or more than one sensor, wherein:
the subordinate CPU stores on the first memory user identification information and the second event as being an event sensed by the authentication sensor, the event being the success of authentication; and
after the transition, the main CPU retrieves the user identification information and the second event from the first memory, the second event indicating the success of authentication, and obtains credentials associated with the user identification information.

7. The image processing apparatus according to claim 6, wherein the authentication device is an external authentication device and performs user authentication as instructed by the subordinate CPU.

8. The image processing apparatus according to claim 1, wherein the subordinate CPU stores the second event and additional events occurring after the first event on the first memory in chronological order, the second event and the additional events indicating events being sensed by the one or more than one sensor.

9. The image processing apparatus according to claim 1, wherein the subordinate CPU stores the second event and additional events occurring after the first event on the first memory such that the second event and additional events are classified by sensor.

10. The image processing apparatus according to claim 1, further comprising:
a document cover event sensor that senses opening and closing of a document cover for covering a platen, the document cover event sensor serving as the one or more than one sensor;
an operation panel having a screen display key for displaying a user-specific registered screen;
a screen display key-pressing sensor that senses the pressing of the screen display key, the screen display key-pressing sensor serving as the one or more than one sensor; and
an authentication sensor that senses success or failure of the authentication provided by an authentication device that performs user authentication, the authentication sensor serving as the one or more than one sensor,
wherein, before the authentication sensor senses the success of authentication, the subordinate CPU stores on the first memory the second event as being an event sensed by the document cover event sensor, the event being the opening and closing of the document cover, but does not store a record on the first memory, the record indicating an event sensed by the screen display key-pressing sensor, the event being the pressing of the screen display key.

11. The image processing apparatus according to claim 1, further comprising:
  a document cover event sensor that senses opening and closing of a document cover for covering a platen, the document cover event sensor serving as the one or more than one sensor;
  an operation panel having a screen display key for displaying a user-specific registered screen;
  a screen display key-pressing sensor that senses pressing of the screen display key, the screen display key-pressing sensor serving as the one or more than one sensor; and
  an authentication sensor that senses success or failure of the authentication provided by an authentication device that performs user authentication, the authentication sensor serving as the one or more than one sensor,
wherein, after the authentication sensor senses the success of authentication, the subordinate CPU stores records on the first memory, the records indicating events sensed by the document cover event sensor and the screen display key-pressing sensor, the events being the opening and closing of the document cover and the pressing of the screen display key, but does not store a record on the first memory, the record indicating an event sensed by the authentication sensor, the event being the success or failure of the authentication.

12. The image processing apparatus according to claim 1, further comprising:
  an operation panel having a copy start key;
  a copy start key-pressing sensor that senses pressing of the copy start key, the copy start key-pressing sensor serving as the one or more than one sensor; and
  a panel processor that controls a set of hardware keys including the copy start key of the operation panel as instructed by the main CPU,
wherein:
  the subordinate CPU stores on the first memory the second event as being an event sensed by the copy start key-pressing sensor, the event being the pressing of the copy start key; and
  after the transition, the main CPU retrieves the second event from the first memory, the second event indicating the pressing of the copy start key, and starts copy.

13. The image processing apparatus according to claim 12, further comprising a document cover event sensor that senses opening and closing of a document cover for covering a platen, the document cover event sensor serving as the one or more than one sensor, wherein:
  the subordinate CPU stores a record on the first memory, the record indicating an event sensed by the document cover event sensor, the event being the opening and closing of the document cover; and
  after the transition, the main CPU retrieves the second event from the first memory, the second event indicating the pressing of the copy start key, but does not start copy unless the main CPU retrieves the record from the first memory, the record indicating the opening and closing of the document cover.

14. The image processing apparatus according to claim 1, wherein:
  the subordinate CPU responds to a signal incoming through a network on behalf of the main CPU;
  after responding on behalf of the main CPU, the subordinate CPU senses print data from the network as the one or more than one sensor,
  the image processing apparatus further comprising a second memory that stores the print data temporarily,
wherein:
  the subordinate CPU stores a record on the first memory, the record indicating an event sensed by the first data receiver, the event being the receipt of the print data; and
  after the transition, the main CPU retrieves the record from the first memory, the record indicating the receipt of the print data, and stores the print data on the second memory.

15. The image processing apparatus according to claim 1, wherein:
  the subordinate CPU responds to a signal incoming through a facsimile line on behalf of the main CPU;
  after responding on behalf of the main CPU, the subordinate CPU senses facsimile data from the facsimile line as the one or more than one sensor,
  the image processing apparatus further comprising a second memory that stores the facsimile data temporarily,
wherein:
  the subordinate CPU stores a record on the first memory, the record indicating an event sensed by the second data receiver, the event being the receipt of the facsimile data; and
  after the transition, the main CPU retrieves the record from the first memory, the record indicating the receipt of the facsimile data, and stores the facsimile data on the second memory.

16. An image processing apparatus comprising:
  one or more than one sensor that senses an event on the image processing apparatus;
  a first memory;
  a main CPU that loses power supply while sleep mode is on; and
  a subordinate CPU that receives power supply even while sleep mode is on,
wherein:
  the subordinate CPU performs: terminating sleep mode; judging whether or not an event occurs on the image processing apparatus by inquiring of the one or more than one sensor, at predetermined intervals during the transition of the main CPU from sleep to normal operation; and storing a record of an event on the first memory if it occurs; and
  after the transition, the main CPU retrieves the record from the first memory and performs processing using it;
  the image processing apparatus further comprises:
  an operation panel having a copy start key;
  a copy start key-pressing sensor that senses pressing of the copy start key, the copy start key-pressing sensor serving as the one or more than one sensor; and
  a panel processor that controls a set of hardware keys including the copy start key of the operation panel as instructed by the main CPU,
wherein the subordinate CPU stores a record on the first memory, the record indicating an event sensed by the copy start key-pressing sensor, the event being the pressing of the copy start key, and
  after the transition, the main CPU retrieves the record from the first memory, the record indicating the pressing of the copy start key, and starts copy,
  the image processing apparatus further comprises a document setting sensor that senses setting of a document, wherein:

the subordinate CPU stores a record on the first memory, the record indicating an event sensed by the document setting sensor, the event being the setting of a document; and after the transition, the main CPU retrieves the record from the first memory, the record indicating the pressing of the copy start key, but does not start copy unless the main CPU retrieves the record from the first memory, the record indicating the setting of a document.

17. A non-transitory computer-readable recording medium storing a program for an image processing apparatus comprising:

one or more than one sensor that senses an event on the image processing apparatus;

a first memory;

a main CPU that loses power supply while sleep mode is on; and a subordinate CPU that receives power supply even while sleep mode is on, the program to make the subordinate CPU of the image processing apparatus perform: terminating sleep mode based on the one or more than one sensor detecting a first event to begin a transition of the main CPU from sleep to normal operation; determining whether a second event occurs after the first event on the image processing apparatus by inquiring of the one or more than one sensor, at predetermined intervals during the transition of the main CPU from sleep to normal operation; and responsive to a determination that the second event occurs, storing on the first memory the second event.

* * * * *